United States Patent [19]
Demaree et al.

[11] Patent Number: 5,724,624
[45] Date of Patent: Mar. 3, 1998

[54] SIMPLIFIED TRIGGER, SHUTTER AND FILM ADVANCE SYSTEM SUCH AS FOR USE IN A CAMERA

[76] Inventors: Michael S. Demaree, P.O. Box 262, Porterville, Calif. 93258; John E. Demaree, 1178 Hayes St., Irvine, Calif. 92770

[21] Appl. No.: 578,208

[22] Filed: Dec. 29, 1995

Related U.S. Application Data

[63] Continuation-in-part of Ser. No. 382,914, Feb. 3, 1995, which is a continuation-in-part of Ser. No. 78,737, Jun. 16, 1993, Pat. No. 5,387,957.

[51] Int. Cl.⁶ .................................................. G03B 17/42
[52] U.S. Cl. ........................................ 396/401; 396/412
[58] Field of Search .................................... 391/204, 205, 391/206, 208, 217, 288, 275, 277; 396/401, 403, 411, 412, 511, 512, 513

[56] References Cited

U.S. PATENT DOCUMENTS

| | | | |
|---|---|---|---|
| Re. 34,168 | 1/1993 | Ohmura et al. | 354/288 |
| 3,232,196 | 2/1966 | Sapp, Jr. | 354/204 |
| 3,696,723 | 10/1972 | Ernisse | 354/204 |
| 4,226,517 | 10/1980 | Skarman | 354/206 |
| 4,268,150 | 5/1981 | Cheh | 354/206 |
| 4,602,859 | 7/1986 | Chen | 354/207 |
| 4,681,416 | 7/1987 | Raschke | 354/204 |
| 4,771,303 | 9/1988 | Matsumoto et al. | 354/288 |
| 4,833,495 | 5/1989 | Ohmura et al. | 354/295 |
| 4,954,857 | 9/1990 | Mochida et al. | 354/288 |
| 5,519,427 | 5/1996 | Cavarero et al. | 347/214 |

*Primary Examiner*—Safet Metjahic
*Assistant Examiner*—Nicholas J. Tuccillo
*Attorney, Agent, or Firm*—Lyon & Lyon LLP

[57] ABSTRACT

A simplified trigger, shutter and film advance system such as for use in a camera. In a preferred embodiment the system is mounted in a housing and includes a trigger with a trigger button for pressing by the operator and a trigger point for advancing the film in a film track, a shutter which is simultaneously advanced by the trigger with the film and along a shutter track, a ramp coupled to the housing which engages the trigger point and causes the film and shutter to release, a spring which is coupled to the housing and the shutter and causes the shutter to return to its original position, and a light baffle to reduce the amount of light exposed to the film when the shutter initially returns to its at rest position. In another embodiment suitable for use with 35 mm film, the system is mounted in a camera and includes a simplified trigger, shutter and film advance system which requires fewer components and fewer moving parts than existing cameras and which is operated by pressing the trigger which thereby advances the film and activates the shutter. In another embodiment, the system further includes a substantially unitary trigger mechanism to advance the film and actuate a rotary shutter.

10 Claims, 16 Drawing Sheets

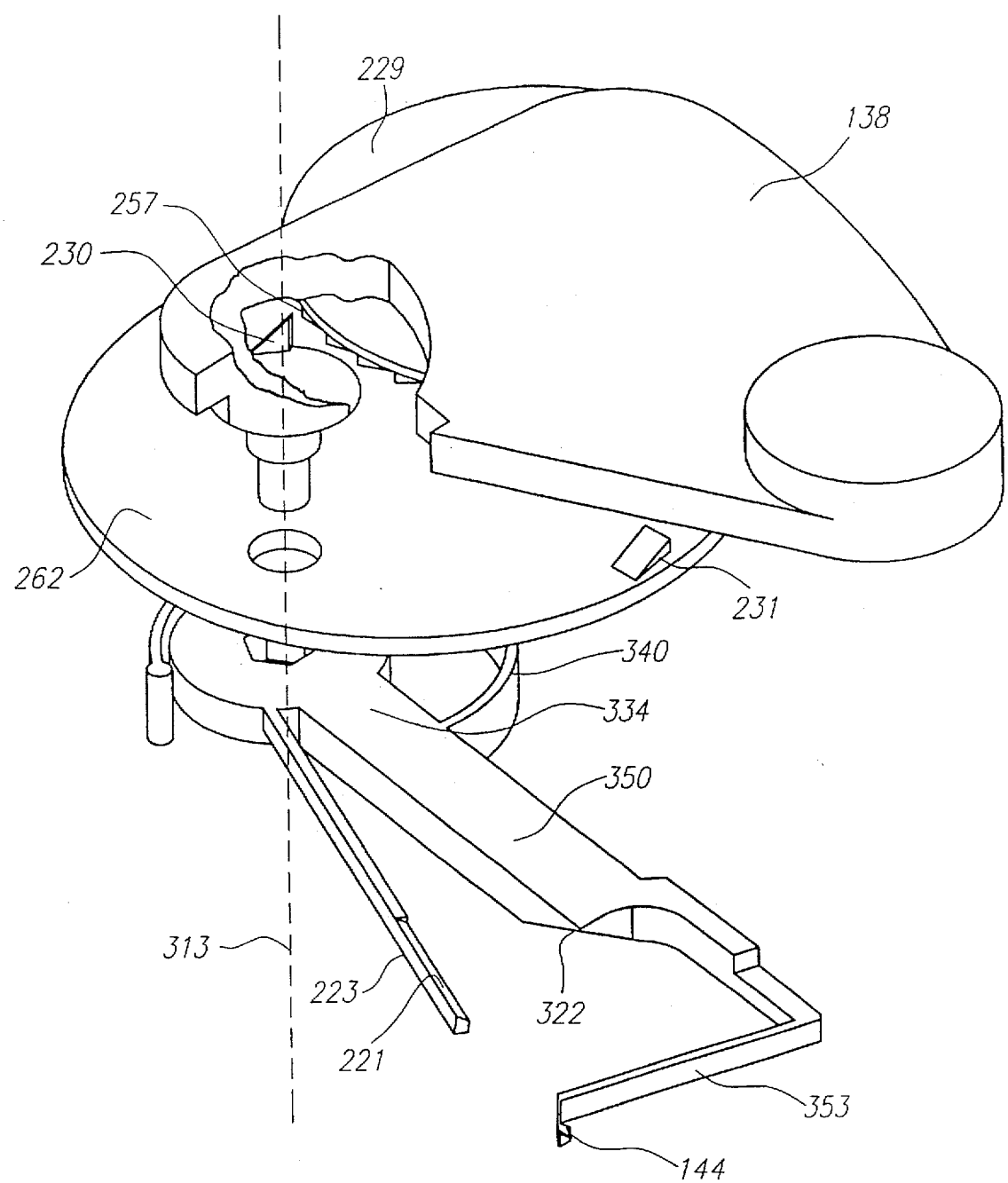
FIG. 23
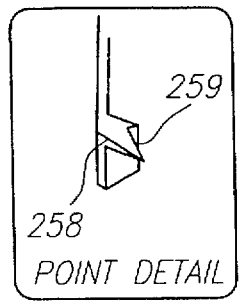
POINT DETAIL

SIMPLIFIED TRIGGER, SHUTTER AND FILM ADVANCE SYSTEM SUCH AS FOR USE IN A CAMERA

This application is a continuation-in-part application of U.S. application Ser. No. 08/382,914, filed Feb. 3, 1995, which is a continuation-in-part application of U.S. application Ser. No. 08/078,737, filed Jun. 16, 1993, and now U.S. Pat. No. 5,387,957, issued Feb. 7, 1995, which prior applications and drawings in their entirety are hereby incorporated by reference as though set forth in full herein.

BACKGROUND OF THE INVENTION

1. Field of the Invention

The field of the invention generally relates to cameras.

2. Description of the Related Art

Because of the popularity of photography in today's society, numerous types of cameras are available, often with relatively expensive options. Recently numerous types of single-use, or disposable, cameras have become available.

In spite of the many advances in photography, however, the manner in which cameras take pictures has changed very little since the inception of photography. Light sensitive film is enclosed in a light-proof box. When a picture is taken, light is allowed to enter the box for a controlled length of time, and that light is focused through a lens onto a part of the light sensitive film, thereby "exposing" one picture. The film is then changed either by advancing the film from a storage spool or reel to a take-up spool or reel if the film is a continuous roll, or by removing the exposed film and replacing it with unexposed film if the film is "plate" type film. The process can then be repeated.

The many innovations to this process include advanced film winders, focus and aperture controls, and improvements in flash technology. The list of innovations is almost endless. All these innovations, however, rely upon making the basic photographing mechanism more complex, and in most cases more expensive. In light of the above, there is a need for a simplified camera design to reduce the cost of cameras, for greater ease of manufacture, and greater simplification of operation and ease of use.

Additionally, with the development of the single-use cameras, there has been an increase in the convenience of cameras to tourists, camera novices and other members of general public. Such single-use cameras, however, are often merely a plastic version of the same general design found in more expensive reusable cameras. The least expensive single-use cameras still commonly use twenty-two parts or more. With so many parts, the cost of manufacture of even the least expensive single-use cameras remains relatively high.

Moreover, conventional single use cameras must utilize separate standard film cassettes to make film removal and film handling in non-light safe environments possible. These separate standard cassettes themselves have many parts which both increase camera costs and also severely limit options for film movement and placement within the camera itself. Accordingly, there is a need for a camera which does not require a separate standard film cassette with its attendant limitations, but which still provides all the advantages of the separate standard film cassette.

Accordingly, there is a need for a single-use camera with a simplified shutter and film-advance system which minimizes the number of parts required and thereby reduces the cost of manufacture, and which further simplifies the operation of a basic camera.

SUMMARY OF INVENTION

This application is a continuation-in-part of co-pending U.S. application Ser. No. 08/382,914. The present invention is directed to a camera and method for exposing film in cameras using a one piece mechanism to advance the film and actuate the shutter. The apparatus and method simplify the photographing process.

In a first, separate aspect of the present invention, a camera employs an arm, which simultaneously advances the film and cocks the shutter, allowing the shutter to expose the film upon release by the arm.

in a second, separate aspect of the present invention, a camera employs a trigger system which advances the film and actuates a shutter member causing the shutter to expose the film.

In yet another, separate aspect of the present invention, a camera contains a moveable wall in each film storage area allowing the pushing of the film into the storage area.

in yet another, separate aspect of the present invention, a film storage area may be detachable from the camera while safely retaining the exposed film in a light-tight environment.

Another embodiment of the present invention is directed to a camera and method for exposing film utilizing a substantially unitary trigger and rotatable shutter armature.

In another aspect of this invention, a trigger strike bar bends against a wedge stop as the trigger is pressed, storing kinetic energy until the strike bar is released to actuate the shutter.

In another aspect of this invention, the trigger spring comprises an integral coil which resists extension during trigger activation to return the trigger to its original position.

In another aspect of this invention, a single finger spring is molded as an integral part of the shutter armature, resting against the case to return the actuated shutter to its rest position.

In another aspect of this invention, the light seal in the opening of the breakaway film cassette comprises a chicane in double chevron configuration to prevent unwanted light from reaching film in the detached cassette.

In another aspect of this invention, the axis of rotation of the shutter armature is moved in the horizontal plane of the camera approximately 103° from the plane of the shutter/aperture/aperture plate.

Accordingly, it is an object of this invention to provide an improved apparatus and method for exposing film. Other objects and advantages will be described below.

BRIEF DESCRIPTION OF THE DRAWINGS

FIG. 23 is a top perspective of the trigger assembly and counter wheel.

BRIEF DESCRIPTION OF THE PREFERRED EMBODIMENTS

The preferred embodiments will now be described with respect to the drawings. Like elements appearing in multiple figures are similarly numbered.

Figure 1:
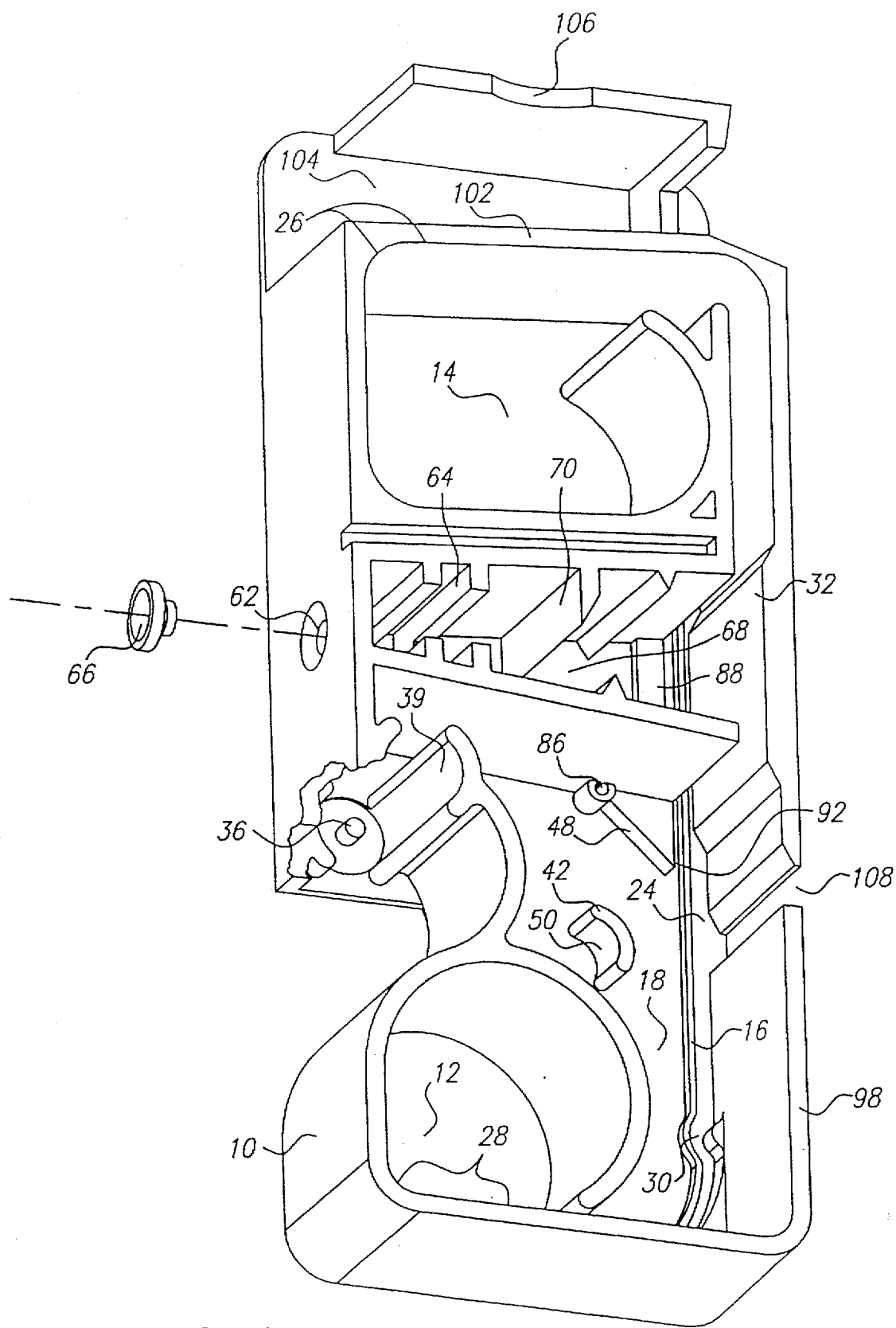
FIG. 1 is a perspective view of a camera case with a lens.
Figure 2:
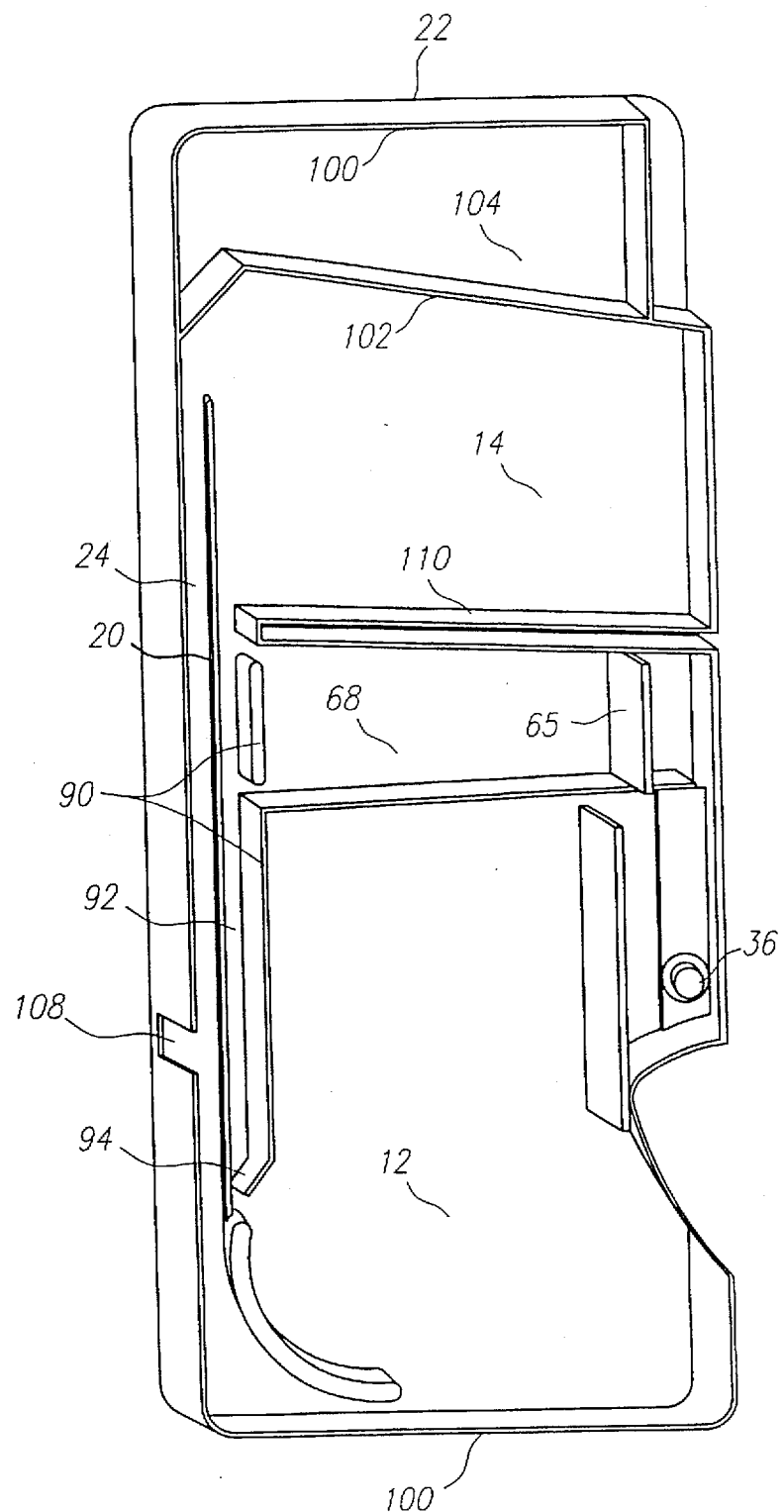
FIG. 2 is a bottom perspective view of the lid.
Figure 3:
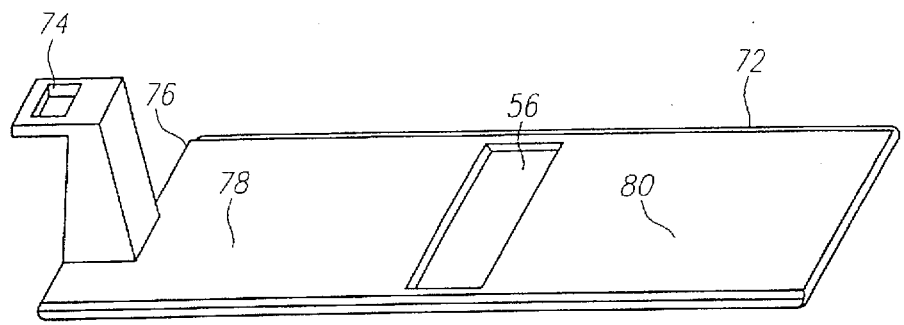
FIG. 3 is a perspective view of the shutter.
Figure 8:
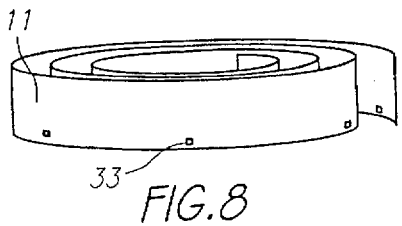
FIG. 8 is a perspective view of the film.

Referring now to FIGS. 1, 2 and 8, the case 10 is a one-piece housing comprised of any suitable material which is both durable, opaque and inexpensive such as plastic. The case 10 has two areas 12 and 14 for storage of the film 11. A first area 12 is suitable for storing and dispensing the film 11 before exposure and the second area 14 is suitable for receiving and storing the film 11 after exposure. There is a small lip 16 on the floor 18 of the case 10, and a matching lip 20 on the lid 22 running between storage areas 12 and 14, creating a film track 24 along which the film 11 may be moved. The case 10 and lid 22 form the housing for the camera and its interior parts.

The storage areas 12 and 14 have certain curved and straight segments 26 and 28 which allow the film to be pushed rather than pulled into the storage area, either when the film 11 is first loaded into the camera or after it is exposed. Straight and curved segments 26 and 28 reduce friction between the film 11 and the case 10 and facilitate the movement of the film 11 into area 12 during film loading and into area 14 during film advance. Storage areas 12 and 14 eliminate the need for spools, axles, spindles or other devices to advance the film 11 into storage area 14.

The film track 24 contains an "S" curve, or bend 30, which prevents unwanted movement of the film 11 when it is in a relaxed position after having been purposefully moved. This bend 30 prevents movement by creating friction of a known value between the film 11 and the film track 24 at an appropriate spot. The bend 30 preferably creates sufficient friction through bending the film 11, yet not so much friction to damage the film 11 as it moves along the film track 24 and through the bend 30. The film track 24 and bend 30 help prevent unwanted movement of the film 11.

The focal plane platform 32 is formed at the wall of the case 10 and is a raised area which reverses the bend in the film 11, causing the film 11 to lie flat against the focal plane platform 32.

Referring now to FIGS. 1, 2, 4, 5, 8 and 9A–D the trigger 34 may be a one piece part which may be made of plastic which passes through the case 10 at, and pivots upon, a light-proof pintle 36 and gudgeon 37 arrangement enclosed within a light-proof barrel or sheath 39. The pintle 36 is preferably located on the case 10 and lid 22, and the gudgeon 37 is preferably part of the trigger 34.

The trigger 34 is initially at an at-rest (FIG. 9A) position. The trigger 34 may be activated by pressing on the trigger button 38 which protrudes from the case 10, causing the portion of the trigger 34 inside the case to swing (FIGS. 9B and 9C) in an arc. At the time of assembly, the trigger catch 40 is placed behind an angled stop 42 on the case 10. The trigger catch 40 acts like a spring to return the trigger 34 to its original at-rest (FIG. 9A) position after the trigger button 38 is released.

Figure 5:
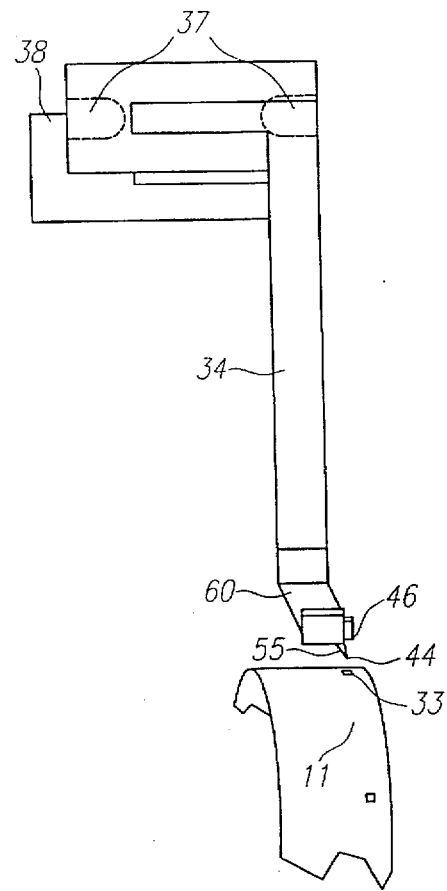
FIG. 5 is a side view of the trigger and film.
Figure 9A:
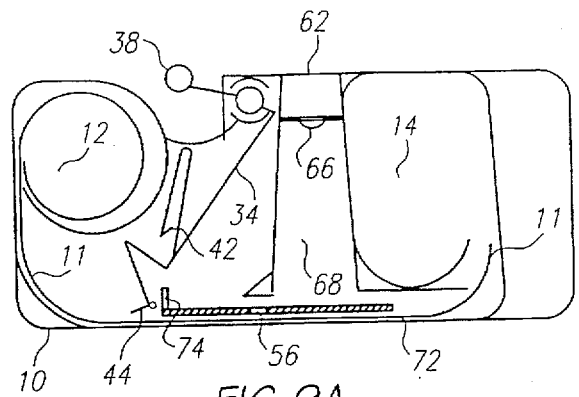
FIGS. 9A–D are a four-part, top view stop action sequence of the camera, trigger and shutter.
Figure 6:
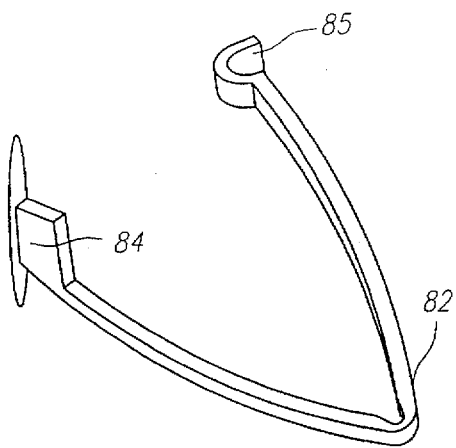
FIG. 6 is a perspective view of the spring.

The trigger point 44, located at the furthest end of the interior part of the trigger 34, is that part which moves the film 11 in the film track 24. When the trigger 34 is at-rest (FIG. 9A), the trigger point 44 is poised above the film 11 in line with the sprocket holes 33 in the film 11, as shown in FIG. 9A and FIG. 5. As the trigger button 38 is pressed and the trigger 34 and the trigger point 44 begin to move in an arc, the trigger point 44 drops into the first available film sprocket hole 33 thus engaging and forming a positive link with the film 11. As the trigger button 38 continues to be pressed (FIG. 9B), the internal portion of the trigger 34 continues in an arc, advancing the film 11 from the unexposed film storage area 12, along the film track 24, and into the exposed film storage area As the internal part of the trigger 34 approaches the end of its available arc (FIG. 9C), a projection 46 on the trigger 34 engages an angled ramp 48 which may be part of the case 10. As the trigger 34 continues its arc, the projection 46 rides up the angled ramp 48, lifting the trigger point 44 out of the sprocket hole 33 in the film 11, and causing the film 11 to stop moving at a predetermined point.

When the trigger button 38 is released by the operator after being fully pressed, the trigger 34 reverses its arc, allowing the trigger point 44 to reverse its travel and slide back to the at-rest position, with the trigger point 44 once again poised above the film 11 and in line with the next sprocket hole 33 (FIGS. 9A and 5).

Figure 4:
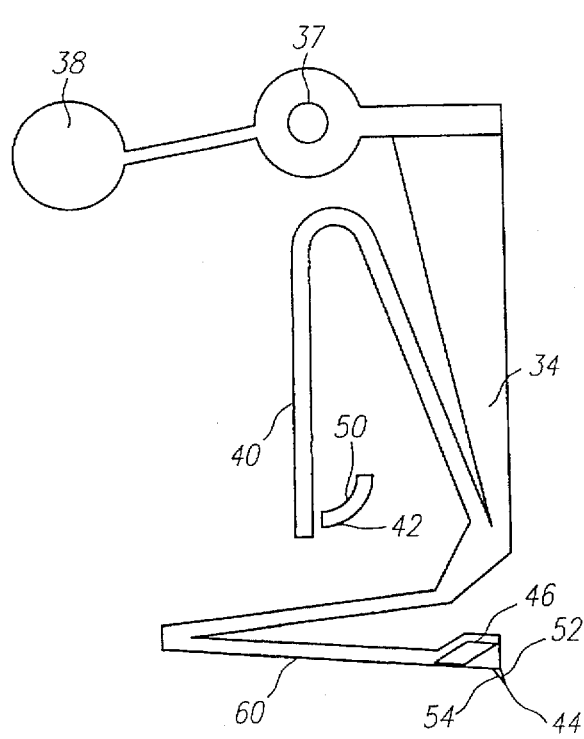
FIG. 4 is a top view of the trigger.

Referring now to FIGS. 1, 4 and 5, the angled stop 42 which is molded into the case 10, and behind which the trigger catch 40 of the molded plastic trigger 34 is placed, has been molded with a specific angle shape 50. The angle shape 50 allows the trigger catch 40 to move on the angled stop 42, thereby compensating for the spring quality of the plastic or other suitable material used. The angled stop 42 has an angle shape 50 that allows the trigger catch 40 to have a controlled and even spring tension throughout the travel of the trigger 34 through its arc of motion. The angle shape 50 is preferably designed to allow the trigger catch 40 to maintain a relatively constant tension, or flex, while the trigger 34 is traveling through its arc.

The trigger point leading face 52 is molded at an angle so that once the trigger point 44 has engaged the sprocket hole 33, the trigger point 44 can be lifted out of the sprocket hole 33 without catching on the edge of sprocket hole 33 which would cause undesired movement of the film 11. The trigger point following face 54 is also molded at an angle that allows the trigger point 44 to return to the at-rest position without interference from the film 11, and sprocket holes 33 or any other obstacle.

Referring now to FIGS. 1, 3, 4, 5 and 9A–9D, the trigger point interior face 55 is molded at an angle that creates a true point as close to the floor 18 of the case as possible, thereby preventing the trigger point 44 from inadvertently dropping into and catching on the shutter opening 56, thereby allowing the trigger 34 to fully return to its at-rest position.

The trigger arm 60 leading to the trigger point 44 is molded in such a way that it acts as a spring to press the trigger point 44 towards the film 11, and to allow the trigger point 44 to travel (FIGS. 9A and 9B) in a line along the flat film track 24 rather than in an arc as the interior portion of the trigger 34 is traveling. The trigger arm 60 also acts to press the trigger projection 46 towards the case 10 so that the projection 46 will positively engage (FIG. 9C) the ramp 48.

The trigger projection 46 is molded at such an angle that it engages the ramp 48 at a low angle of attack so it does not get caught on the ramp 48 or present an abrupt change in movement of the trigger 34. As the trigger 34 rotates through its arc, the ramp 48, with an increasing angle, lifts (FIG. 9C) the trigger point 44 as high as possible in the length of arc available.

The ramp 48 is molded at such an angle that the projection 46 can easily engage the ramp 48, and then the angle increases so the trigger point 44 will be sufficiently raised to completely clear the film 11 and any other moving parts by the end of the travel arc (FIG. 9D) of trigger point 44.

Referring now to FIGS. 1 and 2, there is an aperture 62 in one side of the case. Just inside that aperture is a lens receptacle 64 in which the lens 66 is mounted. The lens 66 is preferably a one-piece injection molded lens, molded to focus light entering the aperture onto the film 11 located at the focal plane platform 32. The lens receptacle 64, and the receptacle closure 65 in the lid 22, form a complete light block, so that any light entering the aperture 62 must pass through the lens 66. As light passes through the lens 66 it is contained in the light box 68 area of the case 10 and the lid 22. The light box 68 prevents the light from entering any other part of the camera other than to shine on the focal plane platform 32 at the farthest end of the light box 68. The lens receptacle 64 may be molded in such a way that the lens 66 can be easily pressed into place and the lens receptacle 64 holds the lens 66 in the correct position for focus, without movement and without sufficient force to distort the lens 66.

There is a light baffle 70, creating a vignette, molded into the side of the light box 68 in the case 10. The light baffle 70 is designed to slightly reduce the amount of light reaching one edge of the film to be exposed, thereby compensating for the initial inertia and resulting slower speed of the shutter 72 at the beginning of the movement of the shutter 72 across the focal plane platform 32 to expose a picture on the film 11.

Figure 9B:
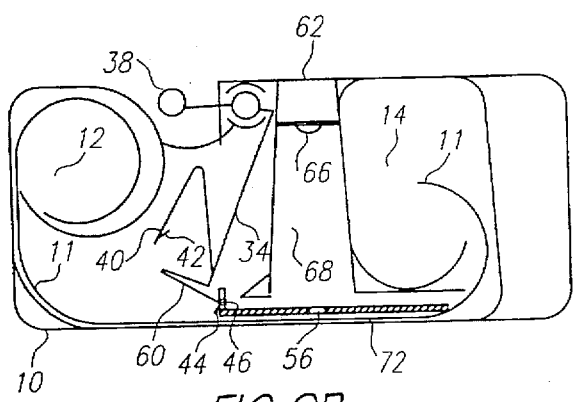
Figure 7:
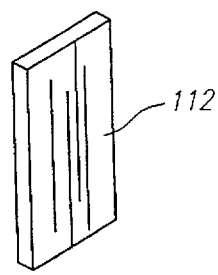
FIG. 7 is a perspective view of the secondary lid.
Figure 9C:
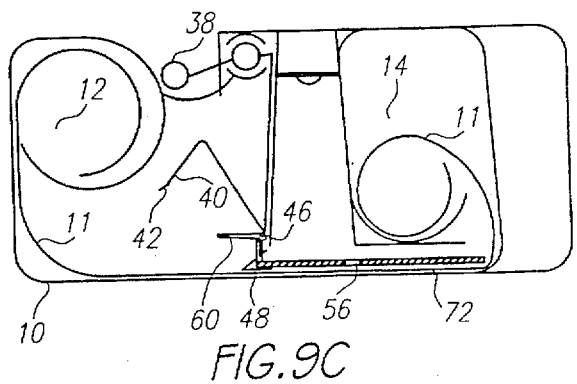

Referring now to FIGS. 1, 3, 6 and 9A–D, the shutter 72 is a one piece plastic part which in the preferred embodiment serves two functions: to prevent light from reaching the film 11, and to allow light to reach the film 11 when a picture is taken. In the preferred embodiment the shutter 72 has at-rest FIG. 9A) and extended (FIG. 9C) positions. The extended position is achieved when the trigger 34 has nearly travelled to its extended position. The shutter 72 returns to its at-rest position through the use of the spring 82. The shutter 72 is basically a flat rectangular panel with a rectangular opening 56 in its center, and a hook-eye 74 at one end, and a push-plate 76 next to the hook-eye 74. The shutter 72 is as wide as the film 11 being used. The shutter 72 has two flat panel areas 78 and 80. Each of the flat panel areas 78 and 80 on the sides of the opening 56 is preferably as long as the film required for one "exposure". When the shutter 72 is at rest, flat panel 80 covers that portion of the film 11 which is on the focal plane platform 32 at the end of the light box 68, preventing it from being exposed. When the shutter 72 is at rest (FIG. 9A), the shutter opening 56 is outside the light box 68. As the trigger button 38 is pressed and the trigger point 44 advances the film 11, the leading face 52 of the trigger point 44 on the trigger 34 also nearly simultaneously presses against the push-plate 76 and slides the shutter 72 across the area in front of the focal plane platform 32 of the light box 68 (FIG. 9B). The film 11 and the shutter 72, both being moved by the leading face 52 of the trigger point 44 and move at the same speed across the light box 68. As the shutter 72 and film 11 move together across the light box 68, the light in the light box 68 which shines on the shutter opening 56 over-exposes a part of the film 11 which will be between two pictures and is preferably not used. As the trigger point 44 which is pushing the film 11 and the shutter 72 across the light box 68 approaches the end of its arc, the shutter 72 achieves its most extreme position (FIG. 9C). In this extreme position, the shutter opening 56 is outside the light box 68 on the opposite side from its at-rest position, and the other flat panel 78 of the shutter 72 is protecting from exposure that part of the film 11 that is intended to be exposed for a picture in this sequence.

Figure 9D:
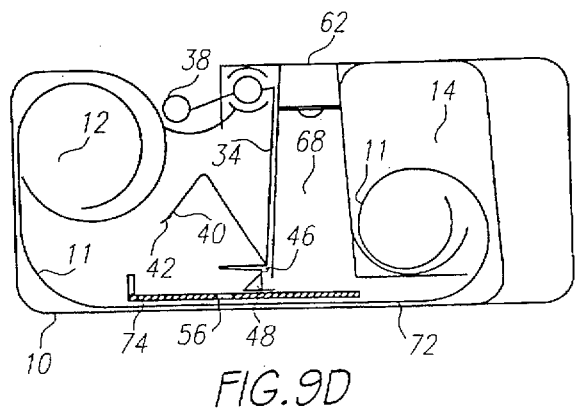

As the projection 46 strikes the ramp 48 and rides up, the trigger point 44 lifts free of the film sprocket hole 33, and the film 11 stops advancing. As the trigger point 44 continues to rise, it also releases the shutter 72, which is spring loaded with shutter spring 82. As the shutter spring 82 returns the shutter 72 towards its at rest position, the shutter opening 56 passes over the area of the focal plane platform 32 and film 11, exposing one picture. When the shutter 72 is again at-rest, the shutter panel area 80 again covers the exposed film picture, preventing further exposure of the film 11 (FIG. 9D). The shutter speed and resulting exposure time of the film 11 is determined by, among other things, the size and weight of the shutter 72, the size of the rectangular opening 56, and the tension provided by shutter spring 82.

A single press of the trigger 34 spring loads the shutter 72, advances the film 11, and releases the shutter 72 to expose one picture. This accomplishes an auto-wind feature eliminating the possibility of double exposures.

The push-plate 76 is molded at a specific angle so that as the trigger point 44 lifts out of the film sprocket hole 33 and the film 11 stops moving, the shutter 72 is also able to stop moving because the specific angle molded into the push-plate 76 allows the trigger point 44 to continue in its movement up the ramp and forward through the arc of the interior trigger 34 without further advancing the shutter 72.

The shutter opening 56 is molded in such a way to prevent the trigger point 44 from hanging-up on or dropping into the shutter opening 56 when it returns to the at-rest position.

Referring now to FIGS. 9A–D, the trigger 34 and shutter 72 are shown as they are assembled inside the case 10. In FIG. 9A, the trigger 34 and shutter 72 are in their at-rest position. In FIG. 9B, the trigger 34 is advancing the shutter 72 and film 11. In FIG. 9C, the trigger projection 46 has engaged and ridden up the angled ramp 48, and the film 11 and shutter 72 have reached their extreme position for an exposure sequence. In FIG. 9D, the trigger point 44 has finished its arc and the trigger protection 46 has completed its travel up the ramp 48 releasing the shutter 72 which has returned to its original at-rest position after being released by the trigger point 44. The trigger button 38 is then released allowing the trigger 34 to return to its at-rest position as shown in FIG. 9A, while the film 11 remains in its advanced position for the next sequence.

Referring now to FIGS. 3, 4, 5, 6 and 9A–D, the shutter spring 82 may be a one piece plastic spring, one end 84 of which is inserted into a spring receptacle 86 in the case 10, and the other end 85 of which is hooked into the hook-eye 74 on the shutter 72 at the time of camera assemble. A purpose of the shutter spring 82 is to expose one picture when the shutter 72 is released by the trigger point 44 by moving the shutter 72 at constant known speed across the area of the focal plane platform 32 and film 11 from the extreme position (FIG. 9C) of the shutter 72 back to its at-rest position (FIG. 9A).

Referring now to FIGS. 1, 2, 7 and 9A–D, the case 10 and lid 22 both have short lips 88 and 16 in the case 10, and short lips 90 and 20 in the lid 22, which create a shutter track 92 parallel to the film track 24, and separates the film 11 from the shutter 72. The edges of the shutter 72 ride in the shutter track 92 with minimum and predictable friction.

The at-rest end of the short lip 90 in the lid 22 which forms the shutter track 92 is molded at such an angle as to form a shunt 94 which re-directs the momentum of the returning shutter 72, allowing the shutter 72 to immediately stop in the at-rest position, without bounce or shudder.

The upper lip 98, of the case 10 is molded in a "U" shape (not shown) to receive the lip 100 of the lid 22 in such a way as to prevent the entrance of light into the Camera. One end of the case 10 and the lid 22 is walled off 102 and light sealed to form a view-finder 104 for the camera.

A slot 106 is molded into the case 10 in the side by the view-finder 104 to facilitate the removal of the lid 22 for the removal of film 11.

The lid 22 is molded in such a way as to allow the part of lid 22 which covers the storage area 14 and the view-finder 104 to bend or break along a light box wall 110 beside the light box 68, so that when the camera is being unloaded in a light-safe environment, the technician can simply place a thumb or other suitable device in the slot 106 on the case 10 and push the lip 100 above the thumb slot 106 upwards, rendering the exposed film storage area 14 accessible for easy film removal.

The film loading slot 108 at the back of the case 10 and lid 22 is used to push film 11 into the camera after the camera is fully assembled. After the film 11 is in the film storage area 12, the slot 108 is covered with a light proof secondary lid 112.

Because the film is simply pushed into the camera's film storage area 12, no spools, spindles or film cartridges or other devices are needed to hold the film 11 in the camera.

Figure 10:
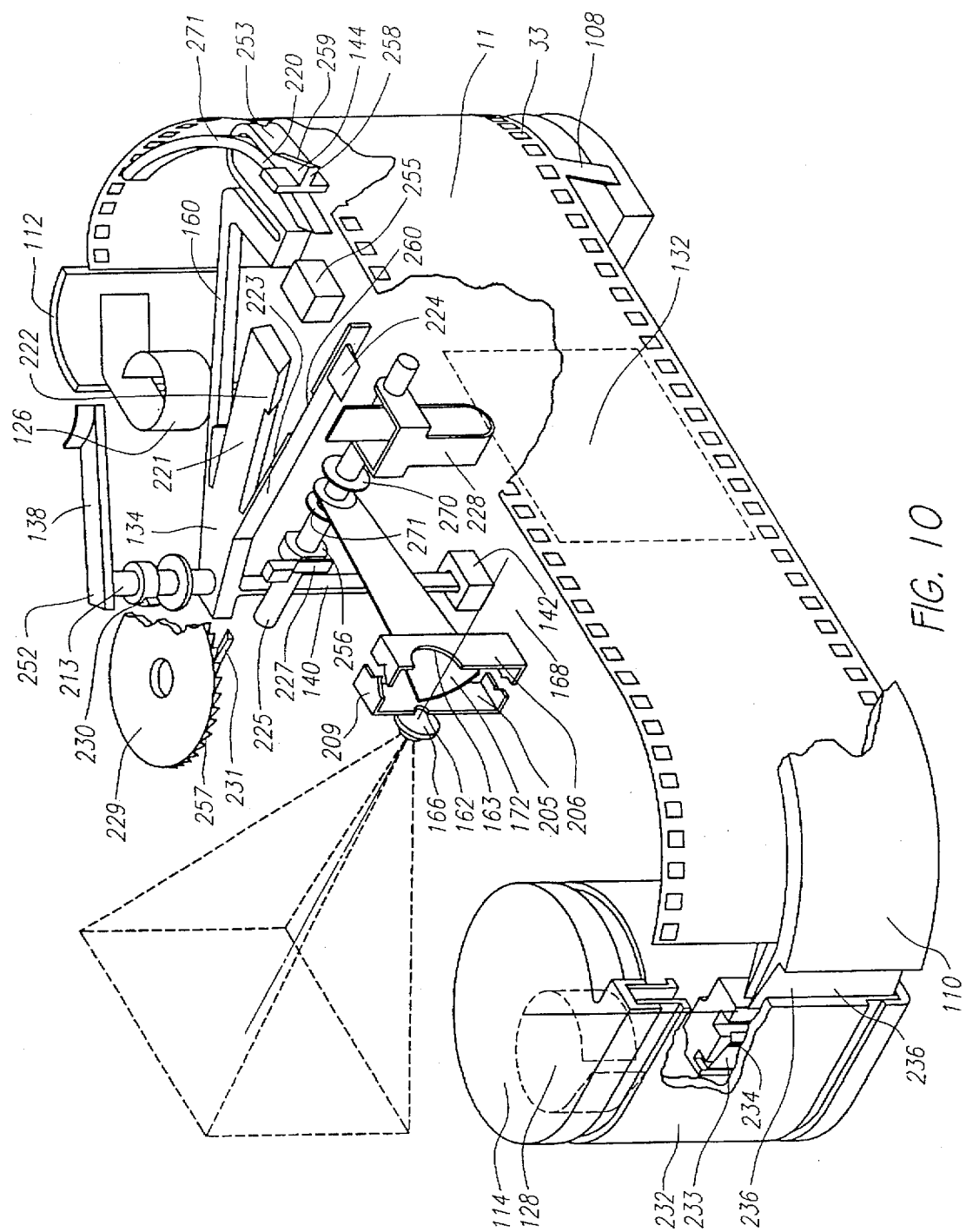
FIG. 10 is a cut-away perspective view of the internal components of a second camera.
Figure 11:
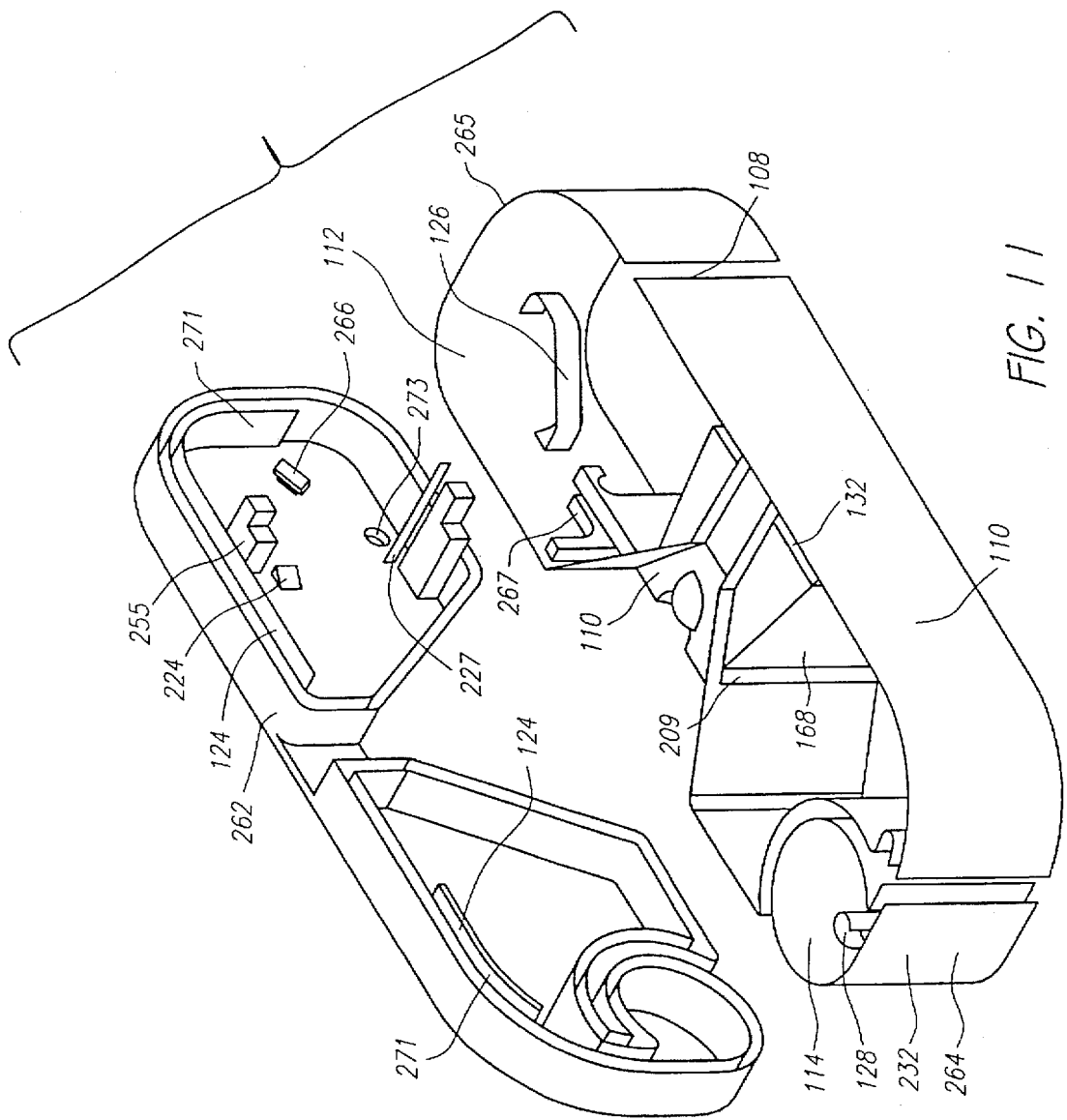
FIG. 11 is a perspective view of a core and open top lid.
Figure 12:
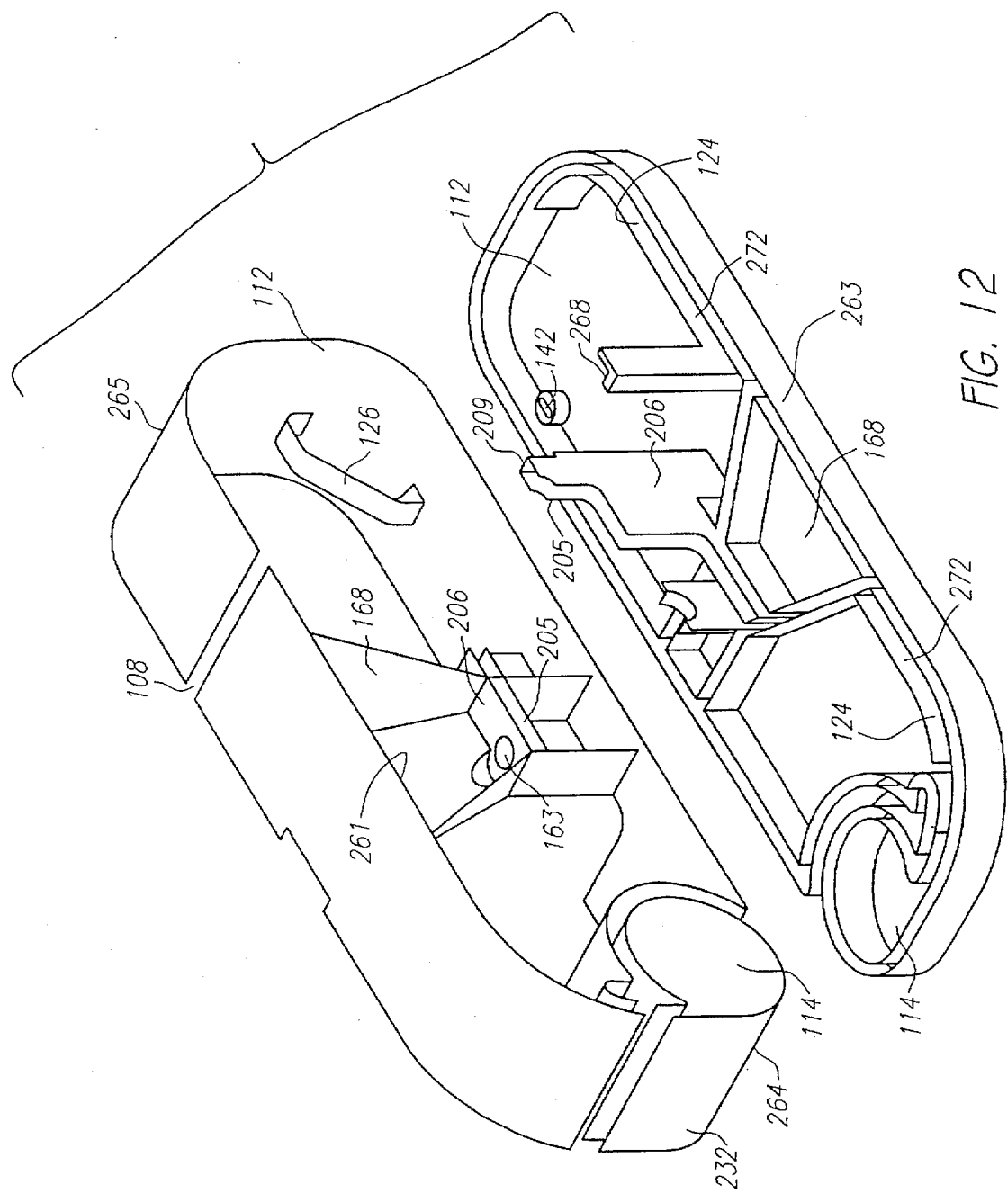
FIG. 12 is a bottom perspective view of a core and open bottom lid.
Figure 13:
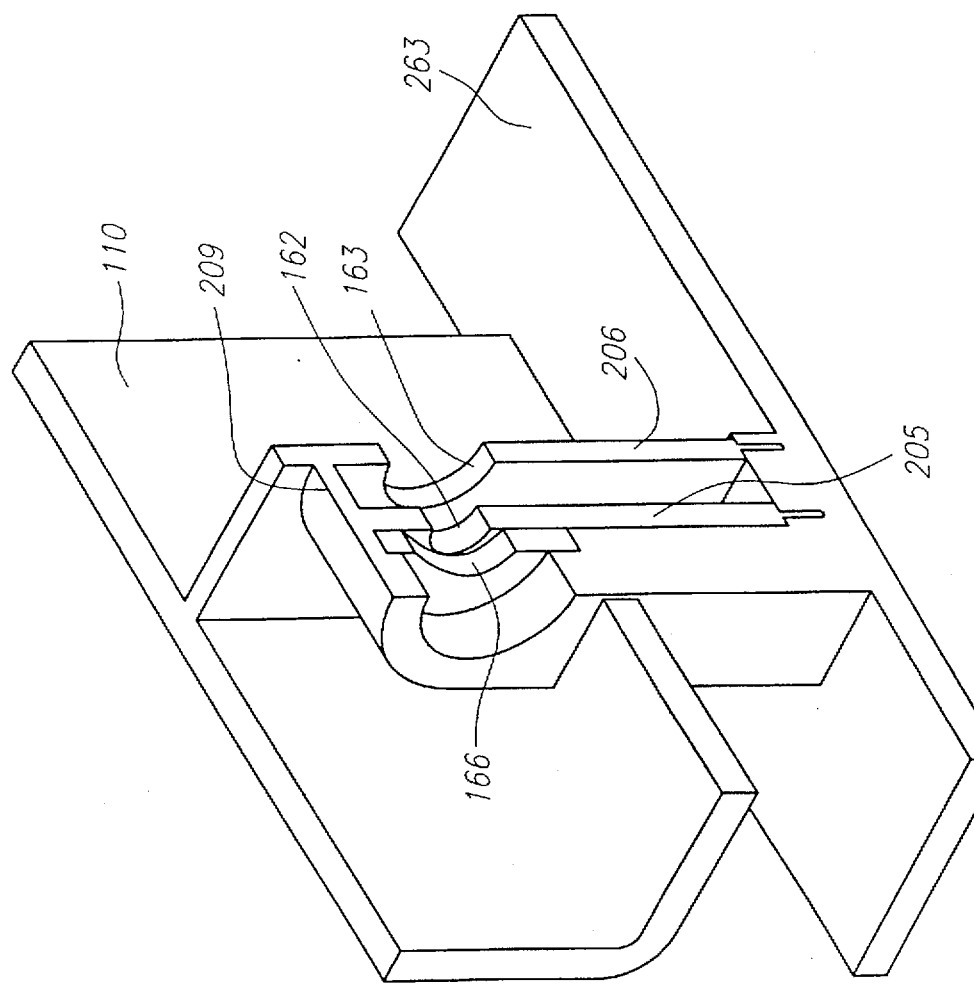
FIG. 13 is a cut-away perspective view of the shutter box and lens.

A second camera suitable for use with 35 mm film is now discussed. Referring now to FIGS. 10, 11 and 12, disclosed is a camera core 110, a top lid 262 and a bottom lid 263 which, when all are assembled, create a light-tight body for the camera. A lens 166 may be approximately centrally located in all three dimensions in the camera. Behind the lens 166 is a light box area 168 which may generally be in the shape of a pyramid as shown in FIG. 12. The light box area 168 may also be configured in other shapes. The light box back surface 261 is adjacent and parallel to the focal plane 132. Film 11 may be located adjacent the light box back surface 261, and light entering the camera body during exposure of the film 11 is focused through the lens 166 to the focal plane 132. Behind and adjacent the lens 166 is first aperture plate 205 having a hole or first aperture 162. First aperture plate 205 may be parallel to the plane of lens 166. Further behind the first aperture plate 205 may be a second aperture plate 206 with a larger, second aperture 163. The second aperture plate 206 generally restricts undesired light passing through aperture 162 from reaching the focal plane 132.

The first aperture plate 205 and the second aperture plate 206 are part of a box which forms a shutter enclosure 209, that blocks all light which might otherwise enter the light box area 168 from the front of the camera. Light for exposing the film 11 is, however, allowed to pass through the lens 166 and the first and second apertures 162 and 163 to the focal plane 132. The first aperture 162 may limit the light which has passed through the lens 166 so that the image reaching the focal plane 132 is preferably clear and sharp.

At the right side 265 of the camera is film storage area 112 which stores film 11 before exposure. At the left side 264 of the camera is film storage cassette 114 which may store the film 11 after it has been exposed. Between film storage area 112 and film storage cassette 114 is a film track 124 which may be formed by an upper lip 271 in the top lid 262 and a corresponding lower lip 272 in the bottom lid 263. When film 11 is moved from the film storage area 112 along the film track 124 it travels across the focal plane 132 where it is exposed during actuation of the shutter.

In a dark room, film 11 may be loaded into the camera through a film slot 108 in the back area of the camera core 110, along a portion of the film track 124, and into the film storage area 112. After loading, film slot 108 may be closed with a gummed foil to prevent light from entering the camera body. During film loading, as the film 11 leaves the film track 124 and enters film storage area 112, it moves along a generally thin, flexible storage blade 126 that generally extends from the inner front wall of the camera core 110 into the storage area 112. Storage blade 126 may be formed into a series of curves and straight lines that initially cause the film 11 to curl and form a roll. As additional film 11 is inserted into film storage area 112, the storage blade 126 may flex in such a way to allow the roll of film to increase in diameter. This increasing diameter reduces the sliding friction of the film 11 as it coils and forms a roll. The storage blade 126 allows the film 11 to be easily pushed into the film storage area 112, and substantially reduces or eliminates the need for additional parts such as multiple light seals and storage spindles.

After exposure, film 11 may be advanced along the film track 124 and into the film storage cassette 114 where it remains until development. As the film 11 leaves the film track 124 and enters the film storage cassette 114, it moves along a generally thin, flexible cassette blade 128 that generally extends from an inner wall of the camera core 110 into the film storage cassette 114. The cassette blade 128 may be formed into a series of curves and straight lines that initially cause the film 11 to curl and form a roll. As additional film 11 enters the film storage cassette 114, the cassette blade 128 may bend and flex in such a way as to allow the roll of film 11 to increase in diameter. The cassette blade 128 thus allows the film 11 to be easily pushed into the film storage cassette 114 and eliminates the need for additional parts such as multiple light seals and storage spindles.

In a preferred embodiment, only two moving parts are needed to accomplish complete camera operation. The first is trigger member 252 which advances the film 11 and provides energy for actuation of the shutter 172. The second is a shutter member 225 which, when activated by the trigger member 252, allows exposure of the film 11. A third, optional moving part is a film counter wheel 229 for indicating the number of exposures.

Referring now to FIGS. 10, 11, 17 and 18, the trigger member 252 may include a rotating trigger rod 213 which is perpendicular to the top lid 262 and bottom lid 263 of the camera, and can be rotatably attached to the top lid 262 through a bearing hole 273. The trigger member 252 may be made of two parts: an activation lever 138, which is an external part which the photographer uses to advance the film 11 and to take pictures, and a trigger rod 213 which may include appendages that are internal parts. The trigger rod 213 and activation lever 138 are movably attached to the top lid 262 of the camera through the bearing hole 273 in such a way as to form a light-tight seal. After passing down through the top lid 262 of the camera, the cross-section of trigger rod 213 may thin to form a torsion spring 140 running from the upper portion of the camera to the bottom lid 263 of the camera where it is retained in a spring slot 142. Alternatively, the trigger rod 213 at this point may be comprised of a material with a sufficient modulus of elasticity to provide the required twisting capability of the torsion spring 140. The spring action of a torsion spring 140 serves to return the entire trigger rod 213 and activation lever 138 to the "at rest" position after lever activation by the photographer.

A trigger arm 134 is preferably molded as a contiguous part of the trigger rod 213 and is parallel and adjacent to the top lid 262 of the camera, perpendicular to the trigger rod 213, and extends from the trigger rod 213 toward the film track 124. The trigger arm 134 preferably consists of three parts, namely, a push bar 160, a lift bar 221 and a strike bar 223. All three parts preferably exist in the same plane, are connected at the end closest to the trigger rod 213, and all are separate at the ends furthest from the trigger rod 213.

Figure 14B:
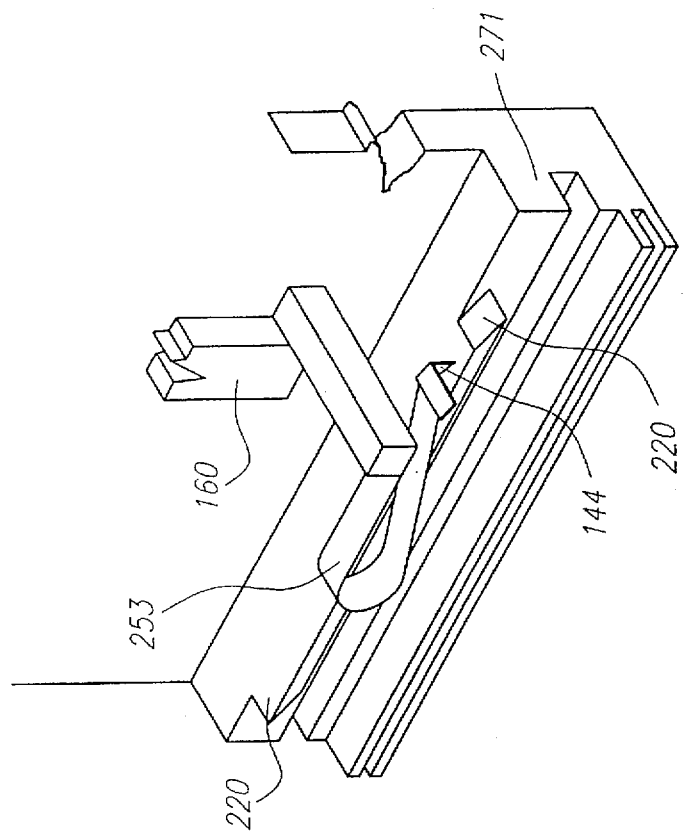
FIGS. 14A–B are two-part, stop-action perspective views of a film advancement pusher point and ramp.
Figure 14A:
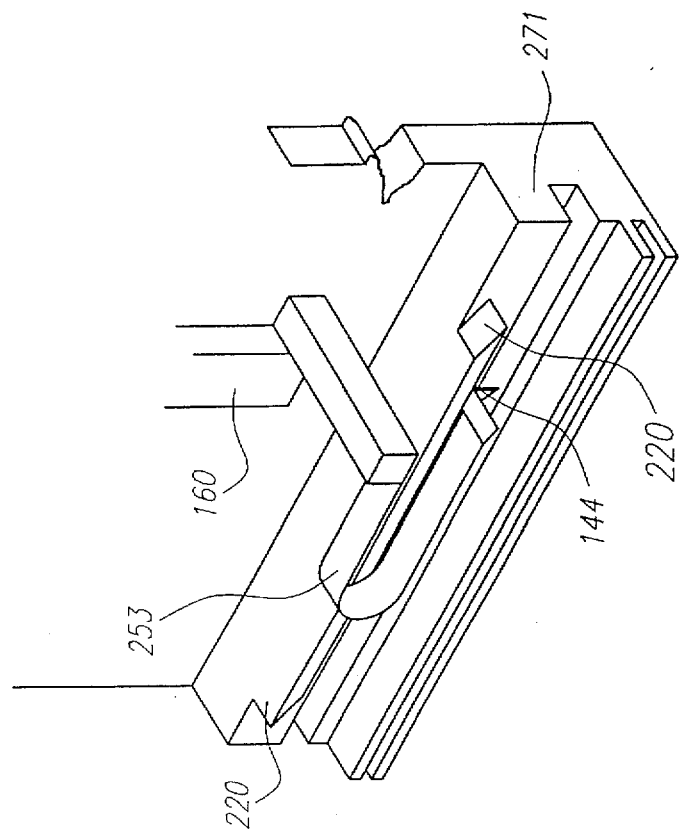
Figure 15A:
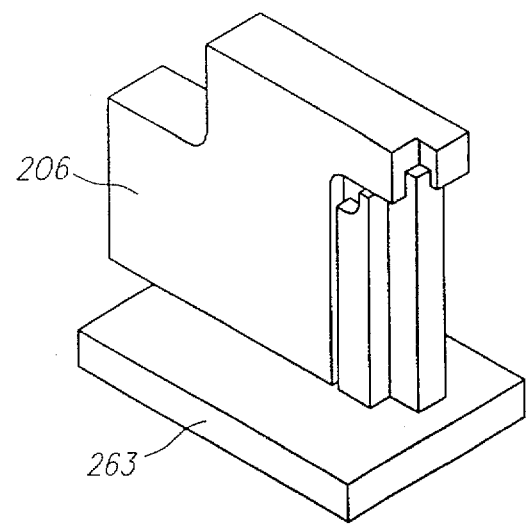
FIGS. 15A–B are cut-away perspective views of a shutter box and a shutter member where it passes through the shutter box.
Figure 15B:
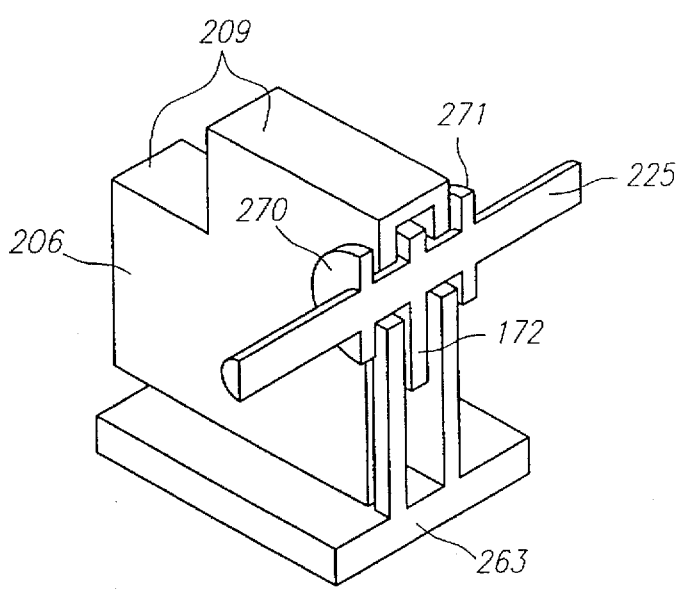
Figure 16:
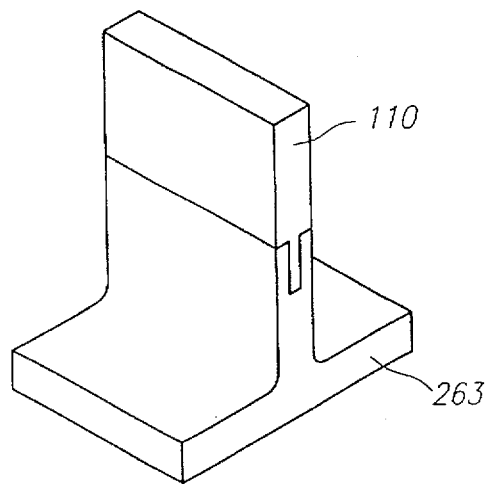
FIG. 16 is a perspective view of a light-tight joint between a core and lid.

Referring now to FIGS. 10, 14A–B, 17A–F and 18, a first part of the trigger arm 134 is a generally flexible push bar 160 extending from the trigger rod 213 to the film track 124 area and generally ending in a flexible "C" shape 253. The furthermost part of the "C" shape 253 is pusher point 144, with a straight leading edge 258 meant to engage the film sprocket holes 33 for advancing the film 11 during lever activation. As shown in FIG. 14A, as the pusher point 144 advances with the film 11, it moves under the ramp 220 which may be an extension of the upper lip 271. During forward motion of the push bar 160, the ramp 220 assures that the pusher point 144 remains securely engaged in the film sprocket hole 33. Should the forward motion of the push bar 160 not be completed for any reason, and if the pusher point 144 is returned to its "at rest" position, the film 11 may be returned to the same position, thereby avoiding the unintentional advance and subsequent loss of unexposed film 11. The pusher point 144 advances the film 11 until the pusher point 144 is past the end of the ramp 220 and the push bar 160 has struck and been stopped by the point stop 255.

The pusher point 144 may include sloped trailing edge 259 which causes the pusher point 144 to rise up out of the film sprocket hole 33 when, after having been stopped, the direction of travel is reversed. As the pusher point 144 returns toward its "at rest" position, the sloped trailing edge 259 may engage the ramp 220 and continue to rise up onto the ramp 220, well clear of possible engagement in the film sprocket holes 33, and the pusher point 144 rides on top of the ramp 220 until it returns to its "at rest" position.

Consequently, when the activation lever 138 is activated and fully depressed, the trigger rod 213 may be rotated and the trigger arm 134 and its parts all generally travel in an arc parallel to the top lid 262 of the camera. The push bar 160 preferably travels in an arc along the film track 124, with the pusher point 144 located under the ramp 220 and engaged in a film sprocket hole 33. At the end of the arc, the push bar 160 comes into contact with a point stop 255, which may be molded into the top lid 262 of the camera, thereby stopping the advance of the film 11 at the desired location. The pusher point 144 and flexible "C" shape 253 are arranged in such a way that when the push bar 160 then starts to return to its "at rest" position, the pusher point 144 may rise out of the film sprocket hole 33 without further movement of the film, and pass over the top of the ramp 220 during return to its "at-rest" position.

Figure 18:
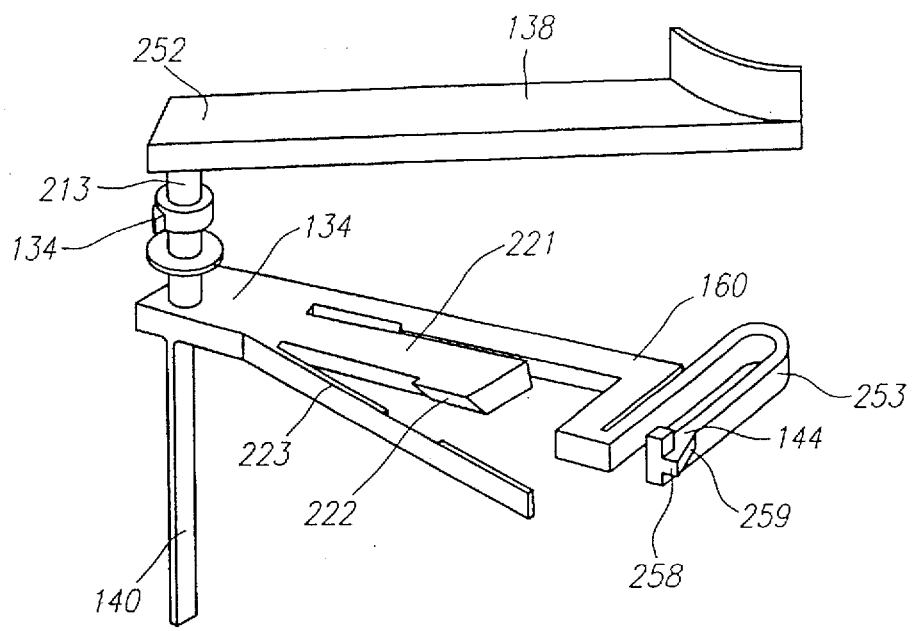
FIG. 18 is a perspective view of the trigger member.

As shown in FIG. 18, the trigger arm 134 may include a rigid lift bar 221 extending from the trigger rod 213 toward the film track 124, that may include a backward beveled lifting edge 222. Because the push bar 160 is preferably flexible, when the push bar 160 hits point stop 255, the lift bar 221 may further proceed a distance along the arc to contact and release the strike bar 223.

The trigger arm 134 may include a flexible strike bar 223 extending from the trigger rod 213 toward the film track 124, with a trailing edge 260 that may be beveled away from the direction of travel of the strike bar 223.

As shown in FIGS. 17A–F, when the activation lever 138 is activated it preferably turns the trigger rod 213 and moves the trigger arm 134 in an arc. This actuation generally causes the end of the strike bar 223 to engage a wedge stop 224 which may be molded or otherwise coupled to the top lid 262 of the camera. As the trigger arm 134 continues along its arc, the strike bar 223 generally bends with the end of the strike bar pressed against the wedge stop 224. Eventually, the lift bar 221 comes against the bent strike bar 223 with the beveled lifting edge 222 of the lift bar 221 in contact with the beveled trailing edge 260 of the strike bar 223. As the lift bar 221 continues along its arc, the lifting edge 222 lifts the strike bar 223 down over the face of the wedge stop 224, preferably allowing the strike bar 223 to release its energy for a quick forward movement.

It is this quick forward movement of the strike bar 223 which provides the energy for actuation of the shutter member 225 and shutter 172. As the activation lever 138 is released, the trigger arm 134 may return to its "at rest" position against a return stop 266, and the strike bar 223 rides up and over the sloping side of the wedge stop 224 and returns to its "at rest" position.

Figure 17A:
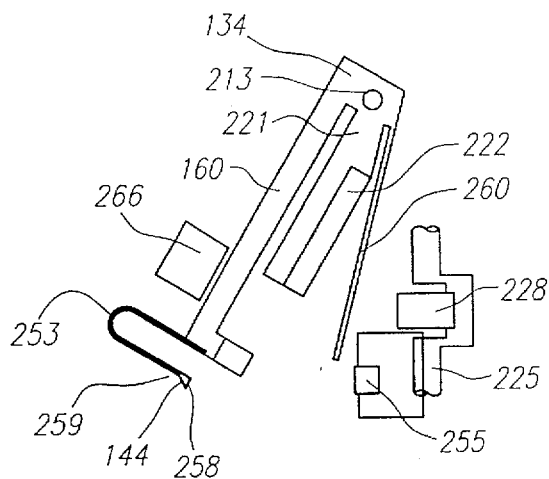
FIGS. 17A–F are six-part, stop action bottom views of the trigger member and shutter member strike clip.
Figure 17B:
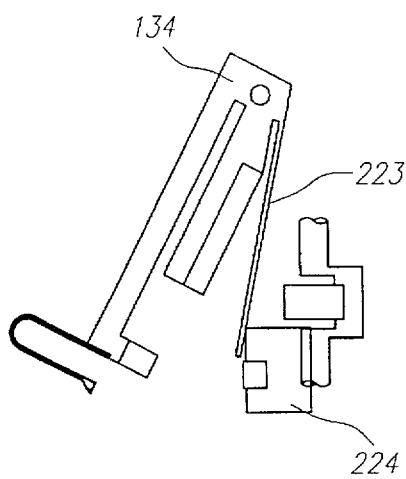
Figure 17C:
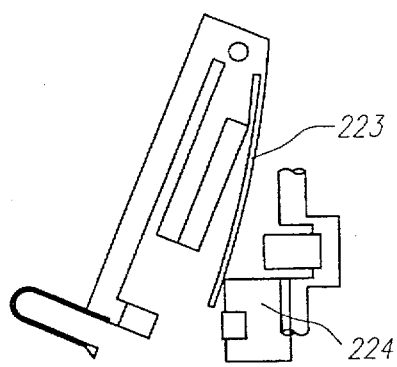
Figure 17D:
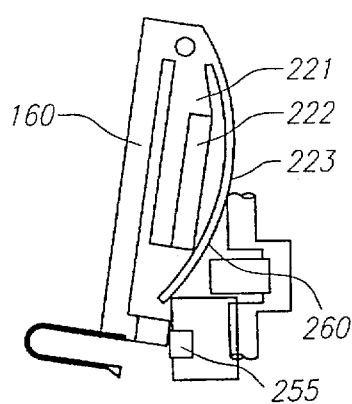
Figure 17E:
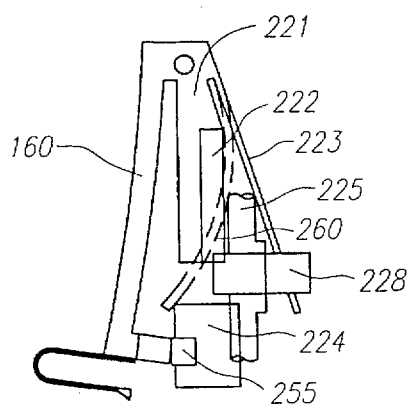
Figure 17F:
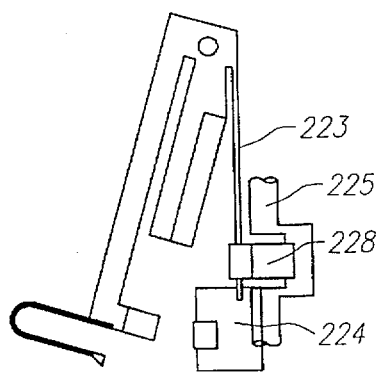

Again, referring to FIGS. 17A–F, the trigger arm 134 and its preferably contiguous appendages are shown at rest in FIG. 17A. As the trigger arm 134 starts its forward arc as shown in FIG. 17B, the push bar 160 with pusher point 144 starts moving the film 11 forward. At this point, the strike bar 223 may begin to bend against the wedge stop 224, as shown in FIG. 17C. As the trigger arm 134 continues along its arc, the push bar 160 with pusher point 144 continues to advance the film 11, the strike bar 223 bends further against the wedge stop 224. As the trigger arm 134 approaches the end of its arc as shown in FIG. 17D, the push bar 160 strikes against a point stop 255 and the film 11 arrives in position and ceases to advance. At this point, the lifting edge 222 of the lift bar 221 may come against the trailing edge 260 of the strike bar 223. As the trigger arm 134 moves to the end of its arc as shown in FIG. 17E, the push bar 160 remains stopped but flexes thereby allowing the lift bar 221 to continue further. As the lift bar 221 continues, its lifting edge 222 lifts the strike bar 223 down over the wedge stop 224, allowing the strike bar 223 to release its energy in a quick forward movement against strike clip 228, which is preferably a part of the shutter member 225. After the trigger arm has completed its arc, a torsion spring 140 returns the trigger arm 134 and its distinct parts toward their "at rest" positions. As the trigger arm 134 returns toward its "at rest" position, the pusher point 144 slides backward through its arc and the flexible "C" shape 253 allows it to move up and out of a sprocket hole 33 to begin its return toward its "at rest" position. The lift bar 221 also moves back through its arc toward its "at rest" position, and the strike bar 223 likewise moves back through its arc, sliding over the slope of the wedge stop 224. The entire trigger arm 134 arrives at its "at rest" position as shown in FIG. 17A ready for the next activation.

Referring now to FIGS. 10, 11, 12, 15 and 19, the second moving part of the camera is a shutter member 225 which is preferably a free turning rod-shaped part with contiguous appendages. The shutter member 225 may be perpendicular to the plane of the lens 166 and may be held in place by a front receptacle 267 which may be molded as part of the front of the camera core 110, and a back receptacle 268 which may be molded as part of the bottom lid 263. The shutter member 225 may include three integral appendages, namely, a shutter 172, a shutter cam 256 and a strike clip 228.

The shutter 172 may be a thin plate which extends at a right angle from the shutter member 225 and is preferably located between the two aperture plates 205 and 206 of the shutter box 209. When "at rest," the shutter 172 generally covers the first aperture 162 to completely prevent any light from shining on the interior of the light box 168 or upon the focal plane 132. When the shutter member 225 is rotated, the shutter 172 allows the desired light to reach the focal plane 132. Rotating the shutter member 225 in the opposite direction returns the shutter 172 to its "at rest" position covering the aperture 162, and again blocking the passage of any light.

Figure 19:
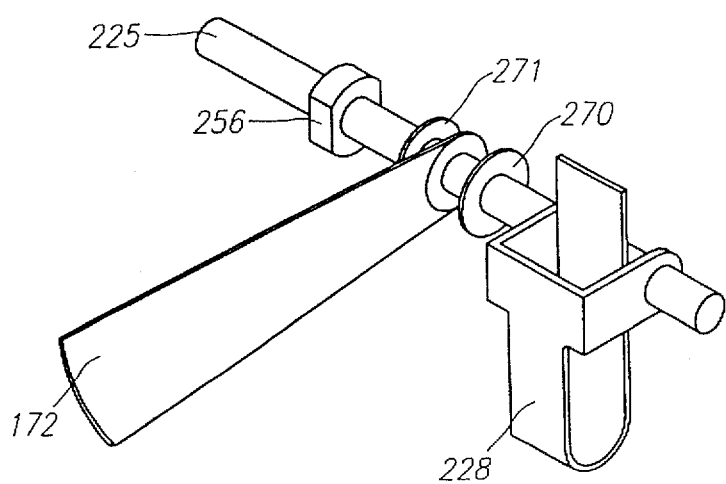
FIG. 19 is a perspective view of the shutter member.
Figure 20:
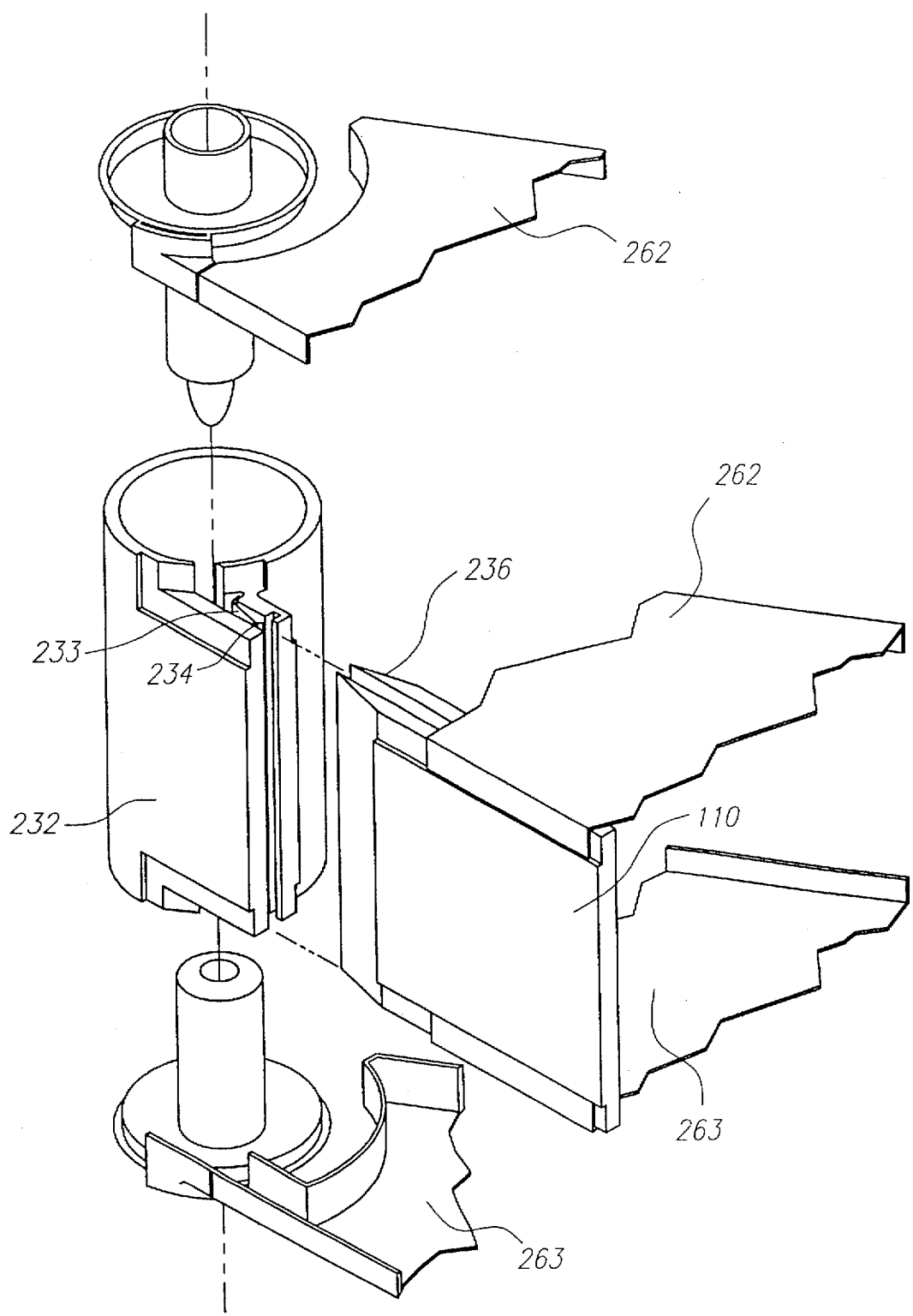
FIG. 20 is an exploded view of the film storage cassette.

As shown in FIG. 19, a shutter cam 256 may be a small plate which may be molded as part of the shutter member 225. When the shutter cam 256 is in its "at rest" position, a flexible spring tab 227, which may be molded into or otherwise coupled to the top lid 262 of the camera (as shown in FIGS. 10 and 11), presses flat against the shutter cam 256 holding the shutter member 225 in its "at rest" position. When the shutter member 225 rotates, the shutter cam 256 presses the spring tab 227 to one side, away from its "at rest" position. When the actuating force is no longer applied to the shutter member 225, the spring tab 227 presses against the shutter cam 256, pushes the shutter cam 256 flat again and rotates the shutter member 225 back to its "at rest" position.

As shown in FIGS. 10, 17A-F and 19, the strike clip 228 may comprise a "U"-shaped part which may be molded as part of the shutter member 225. When the strike bar 223 is released from the wedge stop 224, it hits the strike clip 228, which pushes the long leg of the strike clip 228 and bends it toward the axis of the shutter member 225 until the long leg presses against the short leg. This movement of the long leg of strike clip 228 effectively "closes" the gap between the two legs of the strike clip 228 and rotating the shutter member 225 along its axis. As the shutter member 225 rotates, the strike clip 228 is rotated out of the path of the strike bar 223, which continues past the possible arc of the strike clip 228, leaving the strike clip 228 free to rotate back to its "at rest" position.

After the shutter member 225 has returned to its "at rest" position, the trigger member 252 then preferably returns to its "at rest" position thereby causing the strike bar 223 to pass above the shutter member 225 and hit against the long leg of the strike clip 228 which, because it is open and unimpeded, bends to allow the strike bar 223 to pass and to return to its "at rest" position.

Disks 270 and 271 may also be molded as part of the shutter member 225 in such a way as to assist in making the joint where the shutter member 225 passes through the shutter box 206 as light-tight as possible.

Referring now to FIG. 10, the camera may utilize a generally flexible film counter wheel 229 which rests in a depression on an axle (not shown), which may be molded into the top lid 262 of the camera and located adjacent the trigger member 252. The top of the film counter wheel 229 generally has numbers indicating the number of exposures available or completed. The underside of the film counter wheel 229 may include ratchet teeth 257 pointing down toward the top of the camera. As the trigger member 252 rotates, a pawl 230, which may be a fixed part of the trigger member 252, preferably strikes against the vertical face of a ratchet tooth 257 thereby advancing the film counter wheel 229 one increment. As the trigger member 252 returns to its "at rest" position, the pawl 230 strikes against the sloping face of the ratchet tooth 257, forcing the film counter wheel 229 to bend slightly upward, thereby raising the ratchet tooth 257 and allowing the pawl 230 to pass beneath the ratchet tooth 257 and return to its "at rest" position.

Molded into top lid 262 may be a small tab 231 which engages the film counter wheel 229 between the ratchet teeth 257, thereby preventing undesired movement. When the lever and pawl 230 advance the film counter wheel 229, the small tab 231 forces the film counter wheel 229 to bend slightly upward. The small tab 231 may be located in such a way that if the trigger member 252 is not rotated sufficiently to activate the shutter member 225 and expose the film 11 and is released to return to its "rest" position, the sloping face of the ratchet tooth 257, pressing against the small tab 231, will cause the film counter wheel 229 to not advance and to return to its previous position. Preferably, it is only when the trigger member 252 is rotated sufficiently to cause the exposure of film 11 that the film counter wheel 229 is rotated to the next increment.

Referring now to FIG. 10, 11, 12 and 20, the film storage cassette 114, where film 11 is preferably stored after exposure, may be removable to allow film processing facilities to easily process the exposed film 11. In order for the film storage cassette 114 to be removable, the opening where exposed film 11 moves into the film storage cassette 114 is generally light-tight upon removal. This light-tight environment may be accomplished by the use of a flexible blade 233 which may have a standard velvet-like closure brush 234 attached. When the cassette core 232 of the film storage cassette 114 is mated with the camera core 110, two extensions 236 of the camera core 110 preferably slide into the cassette opening and force the blade 233 away from the film track 124, thereby allowing free and unimpeded entry and travel of film 11 into the film storage cassette 114. When removing the film storage cassette 114, the extensions 236 slide away from the metal blade 233, thereby allowing it to form a light-tight closure of the film storage cassette 114. The top and bottom of the film storage cassette 114 are preferably molded as part of the top lid 262 and bottom lid 263 of the camera so that the entire camera will be light-tight. At the time the film storage cassette 114 is removed for processing, the parts of the top lid 262 and bottom lid 263 which seal the film storage cassette 114 may be broken away from the parts of the lids which seal the camera body. The film storage cassette 114 may also be molded as either a separate or contiguous part of the body of the camera.

An Alternative Embodiment

Figure 21:
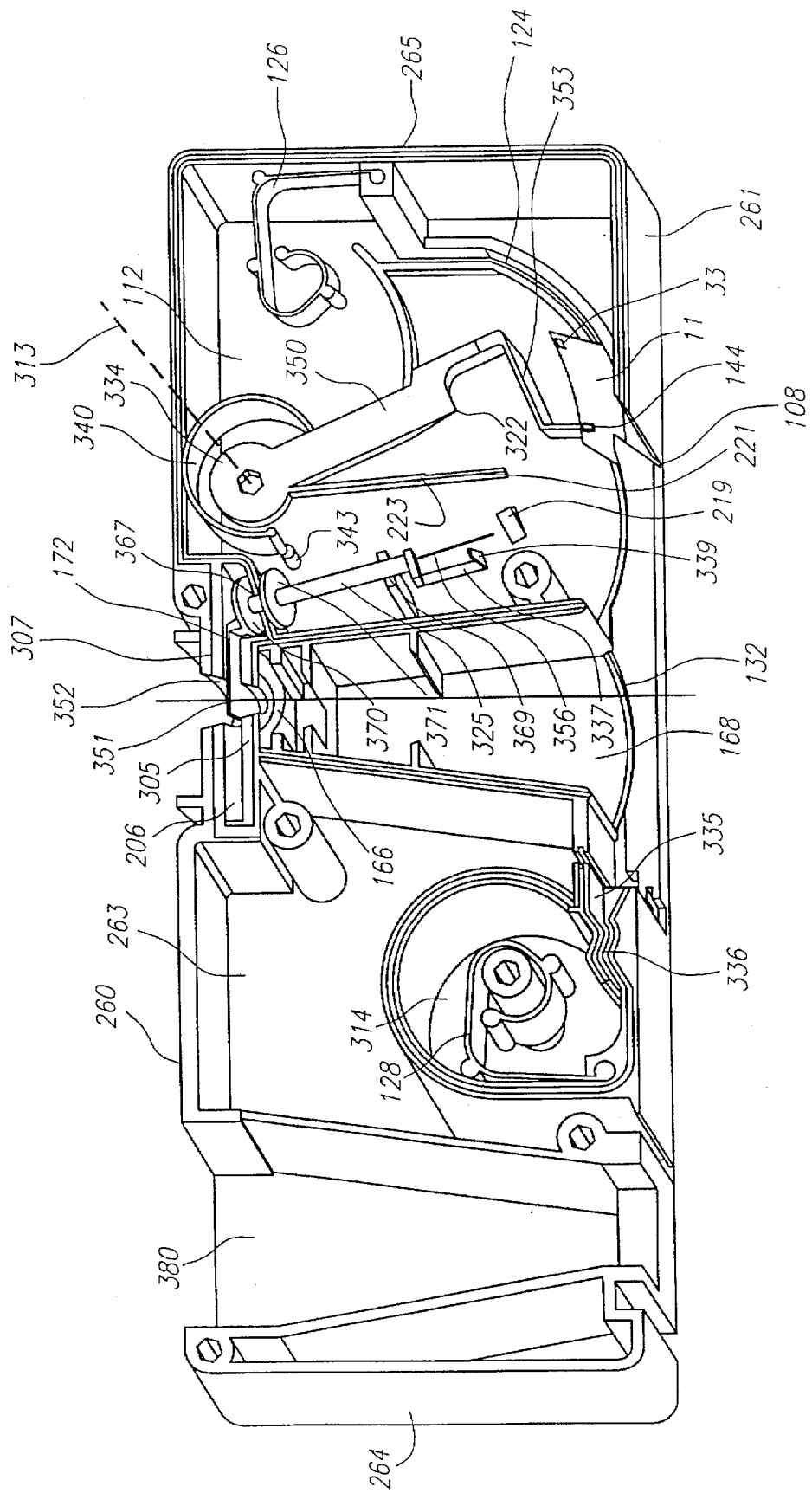
FIG. 21 is a cross-section perspective view of the lower case, including the relative positions of certain interior camera components.
Figure 22:
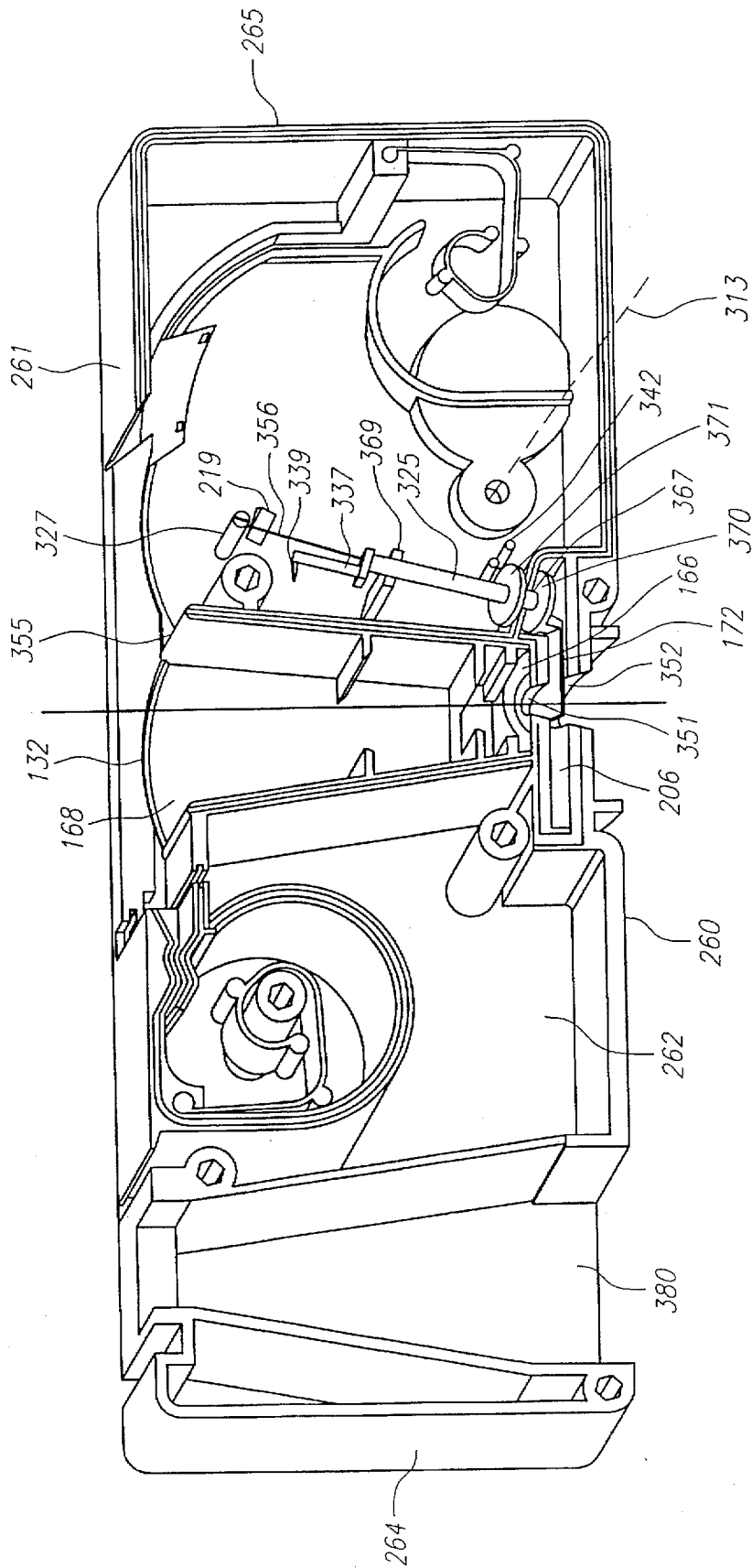
FIG. 22 is a cross-section perspective view of the upper case, including the relative positions of certain interior camera components.

In another embodiment of the present invention, disclosed and described is a standard camera in the relative shape of a rectangular box, which in one preferred embodiment is of the size approximately 1"×2"×5.5". Referring now to FIGS. 21, 22 and 23, there is a lens 166 preferably located near the front 260 as shown. The area behind the lens 166 is a light box 168, which is approximately a four-sided pyramid whose imaginary apex would preferably be located just beyond the lens 166. The back focal plane 132 may be located at the surface of the light box 168, which is the base of the light box pyramid, and the area where the film 11 is located, and upon which the lens 166 focuses light to expose the film 11. The area in front of the lens 166 is also generally a four-sided pyramid with its apex located near the lens 166, and is cut away in such a manner as to allow light (from the subject to be photographed) to enter the lens 166 without impediment or alteration. The altitudes of these two pyramids fall on an axis which is perpendicular to the plane of the lens 166 and which runs through the center of the lens 166.

The front 260 of the camera housing is generally parallel to the front surface of the lens 166. The back 261 of the camera housing may be located approximately two inches from the back of the lens 166 in the preferred embodiment, parallel to the focal plane 132, and adjacent to the focal plane 132. Looking along an axis which runs through and is perpendicular to the back 261, lens 166, and the front 260 of the camera, the top case ceiling 262 of the camera body is preferably located approximately one-half inch above the axis. The bottom case floor 263 surface is preferably located approximately one-half inch below the axis. The left end 264 surface is preferably located approximately three and a half inches to the left of the axis. The right end 265 surface is located approximately two inches to the right of the axis. Also disclosed is viewfinder 380 which preferably comprises an enclosed area toward the left end, which is open to front and back, and which may be used to indicate to the photographer what will be in view in the photograph when taken.

Immediately in front of and adjacent to the lens 166 is inner aperture 351 and inner aperture plate 305. This plate is parallel to the plane of the lens 166 and perpendicular to the axis of the lens 166. A short distance in front of the inner aperture plate 305 is outer aperture plate 307, preferably positioned along an axis parallel to the inner aperture plate 305. Outer aperture plate 307 also preferably comprises an outer aperture 352. Outer aperture 352 is preferably large enough such that a line drawn from any point on the focal plane 132 and passing through the inner aperture 351, would also preferably pass unimpeded through the outer aperture 352. The edges of these two aperture plates are connected by short walls at the top, bottom, left and right, to form shutter box 206. Shutter box 206 blocks all light which might otherwise enter the light box 168 from the front of the camera, except the specific amount of light which passes through the outer aperture 352 and then through the inner aperture 351, and then through the lens 166, then shining on the focal plane 132. Inner aperture 351, as well as partially controlling the amount of light that reaches the focal plane 132, may also serve as an element of focus for the light passing through the lens 166 and onto the focal plane 132, helping to make the image reaching the focal plane 132 as clear and sharp as possible. The inner aperture 351 may also be beveled to provide a precise edge which contributes to the optical system and focus of the camera.

At either end of the camera are film storage areas, and inside and between these film storage areas is film track 124, along which film 11 is moved from one storage area across the focal plane 132 to the other storage area, as well as from outside the camera into a film storage area during initial loading. Storage area 112 is preferably located in the area at the right 265 end of the camera, and is used to store film 11 before exposure. Cassette area 314 is preferably located at the left end 264 of the camera and is used to store film 11 after it has been exposed. Film 11 is loaded into storage area 112 by pushing it through a film slot 108 in the back 261 of the camera, leading from outside the camera into the film track 124 which directs the film 11 into storage area 112.

As the film 11 enters storage area 112 during film loading and leaves the film track 124, it moves along a thin, flexible storage blade 126 that extends from the inner side wall of the right end 265 into the storage area 112. The storage blade 126 may be formed into a series of curves and straight lines that first cause the film 11 to curl and form the basis for a roll of film of particular diameter, and then bend and flex in such a way as to act as a movable storage area wall, thereby allowing the roll of film 11 to increase in diameter as more film 11 is pushed into the film slot 108. Without this storage blade 126, film 11 in quantities of up to approximately twenty-four or more exposures could not effectively be pushed into the storage 112 area, and would instead have to be pulled into the storage area utilizing spindles, light seals and many additional parts.

After exposure at the focal plane 132, film 11 is advanced along a film track 124 and into the cassette area 314. As previously explained, as the film 11 enters the cassette area 314, and leaves the film track 124, it moves along a thin, flexible cassette blade 128 that preferably extends from the inner left wall of the cassette into the cassette area 318. The cassette blade 128 consists of a series of curves and straight lines that first cause the film 11 to curl forming the basis for a roll of film of particular diameter, and then bend and flex in such a way as to act as a movable cassette wall thereby allowing the roll of film to increase in diameter as more film 11 is pushed into the cassette 314. The cassette blade 128, like the storage blade 126, may be used to create a roll of film of either larger or smaller diameter and consequently makes it possible to either push exposed film into the cassette with a minimum of effort, or if desired, to push exposed film into a cassette of the same diameter as a standard film cassette. Without this cassette blade 128, film 11 in quantities of up to approximately twenty-four or more exposures could not effectively be pushed into the cassette. Instead, film 11 would have to be pulled into the cassette 314 utilizing spindles, light seals and many additional parts.

There are only two moving parts needed to accomplish complete camera operation of the present preferred embodiment namely, the trigger assembly which advances the film and activates the shutter, and the shutter armature which comprises principally the shutter itself. There is also a third, optional moving part which is a film counter which is shown in FIG. 23.

As shown in detail in FIG. 23, the trigger assembly rotates along axis 313 which is preferably perpendicular to the top and bottom of the camera. The trigger assembly is preferably located in the front left portion of the storage area 112. The trigger assembly may be molded in two parts: the arm 334, an internal part, and the activation lever 138, an external part. During camera assembly, the arm 334 and lever 138 are preferably glued together at the top of the camera, forming a light tight seal and forming a movable joint with the top lid of the camera.

The trigger arm 334 may sit parallel and immediately adjacent to the top of the camera, perpendicular to the trigger axis 313, and extending from the axis 313 towards the film track 124. The trigger arm 334 consists of three distinct parts.

The first part of the trigger arm 334 is push bar 350. The push bar 350 preferably extends from the axis 313 toward the film track 124, preferably riding flush against the top case ceiling 262 of the camera, and ending in a flexible "L" shape 353. The furthermost part the flexible "L" shape 353 is a film pusher point 144, preferably having a straight leading edge 258 that engages a film sprocket hole 33, thereby advancing the film 11 during lever activation. The pusher point 144 also has a pusher point trailing edge 259, which temporarily raises the pusher point 144 out of the sprocket hole 33 when direction of travel of the pusher point 144 is reversed.

When the lever 138 is activated and fully depressed, the push bar 350 travels in an arc along the film track 124 with the pusher point 144 engaged in a sprocket hole 33 thereby advancing the film 11. At the end of the arc, the pusher point 144 contacts hard stop 355, which is molded into the top case ceiling 262 of the camera, which acts to precisely stop the advance of the film 11. Along the leading edge of the push bar 350 is an area which may be angled at approximately forty-five degrees backward and down from the top case ceiling 262. This area is called the lifting edge 322. Because the "L" shape 353 is flexible, when the pusher point 144 abuts up against the hard stop 355, the push bar 350 may continue a short distance further in its arc of travel. The pusher point 144 and "L" shape 353 are arranged in such a way that when the push bar 350 starts to return to its "at rest" position, the pusher point 144 may rise out of the sprocket hole 33 and pass over the top of the film 11 between the sprocket holes, and then return to the pusher point's at-rest position.

The second part of the trigger arm 334 of the trigger assembly is a flexible strike bar 223. The strike bar 223 extends from the axis 313, approximately three-fourths of the distance to the film track 124. The strike bar 223 preferably rides flush against the top case ceiling 262 of the camera. The trailing edge 221 of the strike bar 223 is preferably beveled away from the top case ceiling 262 of the camera, and away from the direction of travel of the strike bar 223. The strike bar 223 preferably bends easily in the plane of travel of the arm 334, and also at right angles to the plane of travel of the arm 334. When the lever 138 is activated to turn the arm 334 in an arc about the axis 313, the end of the strike bar 223 moves adjacent to a wedge stop 219, which may be molded into the top case ceiling 262 of the camera. The wedge stop 219 is preferably of a wedge shape with the flat edge vertical to the top of the camera and closest to the strike bar 223, and with the slope of the wedge preferably disappearing into the top case ceiling 262 as it slopes away from the strike bar 223 and the vertical edge of the wedge stop 219. As the arm 334 continues to turn, the strike bar 223 preferably bends with the end of the strike bar 223 pressed against the wedge stop 219. The beveled lifting edge 322 of the push bar 350 then continues until it comes against the trailing edge 221 of the bent strike bar 223. As the push bar 350 continues in its arc, the lifting edge 322 lifts the strike bar 223 down and over the face of the wedge stop 219, allowing the strike bar 223 to release its energy in the form of a quick forward movement of the strike bar 223. It is this quick forward movement of the strike bar 223 in striking a part of the shutter armature that causes the shutter armature to move and actuate the shutter.

Another preferable function of the strike bar 223, as part of the trigger assembly, is the isolation of the action of the shutter armature from the action of the trigger assembly 375. This isolation function features a constant level of kinetic energy stored in the strike bar 223 when it is fully bent, a constant rate of energy release (i.e., constant speed of the strike bar 223 at its release) when the strike bar 223 is lifted free of the wedge stop 219 to strike a part of the shutter armature, and a resulting constant rotational speed of the shutter armature. These constants are true regardless of the strength or speed at which the lever 138 part of the trigger assembly 375 is moved by the operator during the picture taking process, and it is these properties which allow the operator to both energize and activate the shutter with one single motion against one part without adversely affecting picture quality or consistency.

The third part of the trigger arm 334 is coil spring 340. The configuration of the coil spring 340 is best described as starting from beneath the trigger arm 334, and moving parallel to the plane of the top case ceiling 262, and then proceeding toward the right, then the front, then the left, and then toward the back of the case. The coil spring 340 thus forms a coil, the free end of which is secured during camera assembly by sliding it into a spring slot 342, which may be an integral part of the top case ceiling 262. A spring slot keeper 343 holds the coil spring 340 in place after camera assembly. The spring slot keeper 343 may be formed as an integral part of the bottom case floor 263. The coil spring 340 serves to rotate the trigger assembly 375 about the axis 313, returning the trigger arm 334 and lever 138 to their "at rest" positions after lever activation is complete. As the lever 138 is released and the trigger arm 334 returns to its "at rest" position, the strike bar 223 rides down and over the sloping side of the wedge stop 219 and returns to its "at rest" position.

Upon activation of the lever 138 about the axis 313, the action of the arm 334 is as follows:

The arm 334 first starts its forward arc. The push bar 350 and pusher point 144 start moving the film 11 forward. The strike bar 223 then begins to bend against the wedge stop 219. As the arm 334 continues along its arc path, the push bar 350 with pusher point 144 continue to advance the film 11. As the arm 334 then approaches the end of its arc, the pusher point 144 strikes against a stop 355 and the film 11 arrives in position and rests. The lifting edge 322 of the push bar 350 moves next to the trailing edge 221 of the strike bar 223. The arm 334 then moves to the end of its arc. The pusher point 144 remains motionless, but the "L" shape 353 flexes, allowing the push bar 350 to continue a bit further. This continuation causes the lifting edge 322 of the push bar 350 to move against the trailing edge 221 of the strike bar 223, thereby lifting the strike bar 223 over the wedge stop 219. The strike bar 223 releases its energy in the form of a constant quick forward movement, thereby striking a part of the shutter armature.

Upon release of the lever 138, the extended coil spring 340 returns the trigger assembly 375 toward its "at rest" position and the action of the arm 334 is as follows:

The pusher point 144 starts backward along its arc and the "L" shape 353 allows it to move up and out of a sprocket hole 33. The push bar 350 moves back along its arc toward its "at rest" position. The strike bar 223 moves back along its arc, slides down over the slope of the wedge stop 219, and then completes its movement toward its "at rest" position, ready for the next lever activation.

The second moving part is the shutter armature 325. The shutter armature 325 is preferably axial, and may be located along a line from the front of the camera toward the back of the camera, and in a preferred embodiment is at an angle of approximately 103 degrees (rotated in the horizontal plane of the camera, measured from the vertical plane of the front of the camera). This location preferably forms an axis parallel to the top case ceiling 262 and the bottom case floor 263, at an angle of approximately 103 degrees from the vertical plane of the front of the camera. The shutter armature 325, free turning, preferably sits in a light-tight front receptacle 367, located in the right side of the inner aperture plate 305, and in a back receptacle 369, which is preferably located approximately one-half of the distance between the shutter box 206 and the film track 124. Both receptacles are molded integral parts of both the top case ceiling 262 and the bottom case floor 263, forming complete receptacles.

In a preferred embodiment, there are five configurations molded as part of the shutter armature 325. The first preferred configuration is the shutter 172, which is a thin plate located in the plane of rotation of the shutter armature, and in the preferred embodiment is positioned parallel to the plane of the front of the camera, at an angle of 103° to the axis of the shutter armature 325. The shutter 172 is located on the portion of the shutter armature 325 between the inner aperture plate 305 and the outer aperture plate 307, and is wholly contained within the shutter box 206. The shutter 172 extends from the shutter armature 325 separating the inner aperture 351 and the outer aperture 352. The shutter 172 presses snugly against the inner aperture plate 305, completely blocking light from the outer aperture 352. When the shutter armature 325 is rotated, the shutter 172 moves forward, because of the non-perpendicular cant of the shutter armature axis, and downward away from the inner aperture 351, because of the axial rotation of the shutter armature. This movement allows the light shining through outer aperture 352 to continue through the inner aperture 351, through the lens 166 and the light box 168, and onto the focal plane 132, thereby exposing the film 11. Rotation of the axle in the opposite direction returns the shutter 172 to its "at rest" position.

A second preferred configuration is the light tight seal formed by outer disk 370 and inner disk 371, where the shutter armature 325 passes through the front receptacle 367, preventing any unwanted light from entering the interior of the camera from the shutter box 206.

A third preferred configuration is a finger spring 356, a small finger of plastic preferably formed as an integral extension of the shutter armature 325, located near the point where the shutter armature 325 rests in the back receptacle 369, and proceeding about a quarter of an inch away from and parallel to the axis of the shutter armature 325. The finger spring 356 preferably ends where it is loosely retained and presses movably against the spring rest 327. When the shutter armature 325 is in its "at rest" position, the finger spring 356 is slightly flexed, holding the shutter 172 against the inner aperture plate 305. When the shutter armature 325 is rotated to open the shutter 172 to expose the film 11, the finger spring 356 preferably being strongly flexed, immediately returns the shutter 172 to its at rest position.

A fourth preferred configuration is anvil 337, a spring like structure which looks like a flat capital letter "L". The main leg of the anvil 337 is preferably an integral extension of the shutter armature 325. The anvil 337 is positioned not coincident with the axis of the shutter armature 325, but slightly to one side of, and parallel to, the axis of the shutter armature 325. The short leg 339 of the "L" of the anvil 337 turns up at a right angle toward the top case ceiling 262. When the strike bar 223 is released from the wedge stop 219, it hits the anvil 337, pushing the short leg 339 of the anvil 337 away and downward along the rotational plane of the shutter armature 325. This hit, which rotates the shutter armature 325 along its axis, causes the shutter 172 to move away from the inner aperture 351 in the shutter box 206, causing the finger spring 356 to press strongly against the spring rest 327. As the shutter armature 325 rotates, the short leg 339 of the anvil 337 rotates both away and down out of the path of the strike bar 223. The strike bar 223 continues past the possible arc of the short leg 339 of the anvil 337, leaving the anvil 337 and the short leg 339 of the anvil 337 free to rotate back in the opposite direction towards their at rest positions. The finger spring 356 rotates the shutter armature 325 back toward its "at rest" position returning the shutter 172 to its "at rest" position over the inner aperture 351. The anvil 337 returns to its "at rest" position. When the trigger assembly is then released and allowed to return to its "at rest" position, the strike bar 223, passes over the wedge stop 219 and above the shutter armature 325, hitting the short leg 339 of the anvil 337. The anvil 337, because it is flexible at right angles to the direction of travel of the strike bar 223 and because the short leg 339 of the anvil 337 is sloped, preferably bends downward, out of the way, allowing the strike bar 223 to pass and to return to its "at rest" position.

A fifth preferred configuration is a counterbalance (not shown) which may be positioned on the shutter armature 325 between the points where the shutter armature 325 rests in the front receptacle 367 and the back receptacle 369. This counterbalance negates any tendency of the shutter to move as a result of any inadvertent hit or abrupt movement of the camera.

During rotation of the shutter armature 325, the shutter 172 preferably strikes the floor of the shutter box 206, causing the shutter armature 325 to stop its rotation and to bounce back towards its at rest position. The finger spring 356, pressing relatively strongly against the spring rest 327, then continues the shutter armature 325 rotating in the opposite direction, toward its "at rest" position.

The rotating shutter armature 325 thereby moves the shutter 172 back to its position over the inner aperture 351, preventing the passage of light from outer aperture 352 through inner aperture 351, thereby preventing further exposure of the film 11 until the next operational cycle. The shutter armature 325 and all its configurations then return to their "at rest" positions.

The camera also preferably utilizes a flexible film counter wheel 229 which may sit in a depression on an axle which is molded into the top case ceiling 262 of the camera and sits adjacent to the lever 138 which actuates the camera. The top of the counter wheel 229 may have numbers indicating the number of exposures available and completed. The underside of the counter wheel 229 preferably has ratchet teeth 257 pointing down toward the top of the camera. As the lever 138 is activated, a pawl 230 which is a fixed part of the lever 138, strikes against the vertical face of a ratchet tooth 257, advancing the counter wheel 229 one increment. When the lever 138 is released to return to its "at rest" position, the pawl 230 strikes against the sloping face of the ratchet tooth 257, forcing the counter wheel 229 to bend slightly upward, raising the ratchet tooth 257, and allowing the pawl 230 to pass beneath the ratchet tooth 257 and return to its "at rest" position. On the opposite side and beneath the counter wheel 229, a small tab 231, beveled at one edge, may be molded into the top of the camera in such a way as to stick up between two ratchet teeth 257 to hold the counter wheel 229 in position and prevent unwanted movement. When the lever and pawl 230 advance the counter wheel 229, the tab 231, by blocking the ratchet tooth 257, forces the counter wheel 229 to bend upward slightly, allowing the ratchet tooth 237 to pass over the small tab 231, allowing the counter wheel 229 to advance to the next increment.

Another part of the camera is the cassette 314 where film 11 is stored after exposure. The opening 335, where exposed film 11 moves into the cassette 314, preferably allows the film 11 to move through a chicane 336 in a double chevron format. This double chevron format allows the film 11 to easily pass through, and also forms a light tight configuration. When the cassette is removed from the camera, creating a situation in which light has access to and can shine into the opening 335 of the cassette 314, the high and low points of the upper and lower parts of the chicane 336 interrupt the straight line travel of any light which might enter through the opening 335 of the cassette 314. The chicane 336 prevents such light from passing through and into the cassette 314, where it might further expose the film 11.

After the film 11 is exposed and stored in the cassette, and the cassette 314 is removed from the camera, the cassette can be handled in a "not light safe" environment without exposure of the film. The upper and lower halves of the cassette 314 may be molded as integral parts of the top and bottom halves of the camera case so the entire camera and cassette may be a light-tight unit when assembled. In this embodiment, the cassette may be connected to the camera case by only two small attachments at the side of the film track 124 where the film track 124 passes into the cassette 314 just before the chicane 336. This attachment may be easily broken apart during the removal of the cassette.

An advantageous and useful feature of the present preferred embodiment is that the axis of rotation of the shutter 172 while still being at a 90° angle to the vertical plane of the shutter/aperture when the shutter is at rest, is not at a 90° angle to the horizontal plane of the shutter/aperture when the shutter is at rest. Rather the axis of rotation is preferably now approximately 103° from the vertical plane of the shutter/aperture when the shutter is at rest. This change in the rotational axis means that when the shutter is at rest it is pressed tight against the aperture plate 305 for the best possible light tight seal, and as the shutter 172 begins to rotate to clear the aperture to expose film, the shutter is moving away from the aperture plate 305 and no longer touches the aperture plate 305 so there is no impediment to the motion of the shutter 172. When the shutter 172 returns toward its at rest position there is still no contact with the aperture plate 305 which might impede the arrival of the shutter 172 at its rest position. It is at a moment nearly simultaneous with the shutter 172 reaching the at rest position that the shutter preferably comes into contact with the aperture plate 305, once again pressing tight against the aperture plate 305, and thereby creating an optimal light tight seal over the aperture.

Another advantageous and useful feature of the present invention is that the usual spring functions to keep the shutter closed when not in use and to close the shutter when it has been used, are preferably replaced by a single finger spring molded as an integral part of the shutter armature, resting against the case.

Another advantageous and novel feature of the present invention is the isolation of shutter action from trigger action in that the amount of kinetic energy stored in the bent leg, the rate of energy release (i.e. speed of the leg at release) when the leg is lifted free of the stop to strike the anvil, and the resulting shutter speed are constant, without any regard to the strength or speed at which the trigger is moved by the operator during the picture taking process.

Another advantageous and novel feature of the present invention is that the part of the shutter axle called the anvil 337 has been designed so that when the anvil 337 is struck, causing the shutter axle to rotate, the direction of travel of the anvil is both away from the strike bar and primarily downward out of the way of the strike bar when that bar is continuing its strike motion arc. This offset allows a much smaller case (utilizing less material and requiring less manufacturing cycle time) without diminishing the ability of the anvil to clear the travel path of the strike bar 223.

Another advantageous and novel feature of the present invention is that the anvil 337 is in fact shaped like a wide "L". This allows it to be perfectly rigid in resisting the hit of the strike bar 223, thereby causing the shutter axle to rotate axially, but is flexible vertically in the plane of rotation, allowing the strike bar 223 during its return to its at rest position to pass over a wedge stop 219 and to move the anvil 337 out of its way and pass on to its at rest position. If the anvil 337 were not inflexible in the direction of travel of the strike bar 223, its being struck would not rotate the shutter axle. If the anvil 337 were not flexible at right angles to the direction of travel of the strike bar 223, the strike bar 223 would be prevented from returning to its at rest position.

Another advantageous and novel feature of the present invention is that the shutter armature 325 has been counterbalanced so any accidental movement or inadvertent hit from any direction will preferably not have a tendency to cause the shutter to inadvertently open and accidentally expose film. Additionally, the counterbalance itself may be increased in balanced mass in order to affect the rotational speed of the shutter armature 325.

Another advantageous and novel feature of the present invention is that the trigger spring may be an integral coil spring which resists extension during trigger activation, substantially decreasing the overall dimensions of the camera.

Another advantageous and novel feature of the present invention is the configuration of the light seal in the opening of the "breakaway" film cassette. Whereas numerous parts and configurations were previously required for light tight seal, the present invention preferably utilizes, a chicane in double chevron configuration which does not impede the movement of film into or out of the breakaway cassette, but prevents unwanted light from getting into the cassette while the cassette is being broken away or after the cassette has been removed from the camera.

Although the present invention has been described in considerable detail with reference to certain preferred versions thereof, other versions are possible. Therefore the spirit and scope of the appended claims should not be limited to the description of the preferred embodiments contained herein.

Thus a camera with a simplified trigger, shutter and film advance system having a reduced number of parts has been shown and described. Though certain examples and advantages have been disclosed, further advantages and modifications may become obvious to those skilled in the art from the disclosure herein. The current invention, therefore, is not to be limited except in the spirit of the claims that follow.

What is claimed:

1. A camera comprising
   a housing including an aperture in an exterior wall, a wedge stop, and a film track for receiving film;
   a lens mounted adjacent said aperture;
   a shutter rotatably mounted in said housing, said shutter being rotatable between a rest position and an actuated position, said shutter covering the aperture in the rest position and opening the aperture in the actuated position to allow light to enter said housing and thereby expose the film;

a substantially unitary trigger rotatably mounted in said housing and having consecutive first, second and third positions, said trigger comprising an arm and a strike bar constructed and arranged to advance from said first position, through said second position, to said third position, said arm engaging a sprocket hole in the film at said first position and advancing the film until reaching said second position, said strike bar engaging said wedge stop between said first and third positions, and said arm engaging and releasing said strike bar from said wedge stop at said third position to thereby allow said strike bar to strike said shutter and rotate said shutter from said rest position to said actuated position.

2. The camera of claim 1, further comprising a spring coupled to said shutter and to said housing, and adapted to return said shutter to said rest position.

3. The camera of claim 1, further comprising a coil spring coupled to said trigger and against said housing, and adapted to return said trigger to said first position.

4. The camera of claim 1, further comprising a film storage area located in said housing and having a flexible blade for storage of film prior to exposure.

5. The camera of claim 1, further comprising a cassette storage area located in said housing and having a flexible blade for storage of film after exposure.

6. The camera of claim 5, wherein said cassette storage area is removable from the camera.

7. The camera of claim 6, wherein said cassette storage area includes a film track for receiving film, said film track having a chicane in double chevron configuration to prevent light from reaching said film inside said cassette storage area after said cassette storage area is removed from the camera.

8. A method for exposing film in a film track comprising the steps of moving a trigger having an actuation lever, a push bar, an arm and a strike bar, by pushing said actuation lever, from a first position, through a second position, to a third position, whereby said arm engages the film in the film track at the first position and advances the film until reaching the second position, said strike bar engaging a wedge stop between the first position and the third position, thereby storing potential energy in said strike bar;

releasing the stored potential energy in said strike bar at the third position to actuate a shutter that is movable between a rest position and an actuated position, said shutter covering said film from exposure to light when in said rest position and not covering said film from exposure to light when in said actuated position.

9. A method according to claim 8, further comprising the step of returning the trigger to the first position using a coil spring.

10. A method according to claim 8, further comprising the step of returning the shutter to its original position using a/spring.

* * * * *